(12) United States Patent
Hasegawa et al.

(10) Patent No.: US 7,683,986 B2
(45) Date of Patent: Mar. 23, 2010

(54) ANISOTROPIC SCATTERING FILM FOR IMPROVING THE VIEWING ANGLE DEPENDENCY OF A LIQUID CRYSTAL DISPLAY

(75) Inventors: Masahiro Hasegawa, Tenri (JP); Akira Sakai, Kyoto (JP); Kensaku Higashi, Shizuoka (JP); Hiroto Katagiri, Shizuoka (JP)

(73) Assignees: Sharp Kabushiki Kaisha, Osaka (JP); Tomoegawa Co., Ltd., Tokyo (JP)

( * ) Notice: Subject to any disclaimer, the term of this patent is extended or adjusted under 35 U.S.C. 154(b) by 442 days.

(21) Appl. No.: 11/524,308

(22) Filed: Sep. 21, 2006

(65) Prior Publication Data

US 2007/0064180 A1   Mar. 22, 2007

(30) Foreign Application Priority Data

Sep. 21, 2005   (JP)   ............................. 2005-273746
Sep. 12, 2006   (JP)   ............................. 2006-247067

(51) Int. Cl.
*G02F 1/1335*   (2006.01)
*G02F 1/1343*   (2006.01)

(52) U.S. Cl. ........................................ 349/112; 349/96
(58) Field of Classification Search ................... 349/62, 349/96, 112, 141
See application file for complete search history.

(56) References Cited

U.S. PATENT DOCUMENTS 5,108,857 A      4/1992   Kitayama et al.
5,394,308 A  *  2/1995   Watanabe et al. ............ 362/613
5,851,700 A     12/1998   Honda et al.
6,359,671 B1 *  3/2002   Abileah ....................... 349/119
6,876,415 B2 *  4/2005   Sakai et al. .................. 349/117
6,933,994 B1 *  8/2005   Kaneko et al. ............... 349/112
6,995,820 B2 *  2/2006   Amimori et al. ............. 349/112
7,046,443 B2 *  5/2006   Miyatake ...................... 359/494
7,319,502 B2 *  1/2008   Chen et al. ................... 349/141
2005/0018303 A1  1/2005   Harada
2006/0007371 A1 * 1/2006   Miyatake et al. .............. 349/96
2006/0176425 A1 * 8/2006   Ito et al. ......................... 349/96
2007/0195233 A1 * 8/2007   Hasegawa et al. ............ 349/112
2008/0303995 A1 * 12/2008   Shimodaira et al. ......... 349/117

FOREIGN PATENT DOCUMENTS

| EP | 0406590    | 2/1991  |
|----|------------|---------|
| JP | 63-309902  | 12/1988 |
| JP | 64-40903   | 2/1989  |
| JP | 64-40905   | 2/1989  |

(Continued)

*Primary Examiner*—Uyen-Chau N Le
*Assistant Examiner*—Rhonda S Peace
(74) *Attorney, Agent, or Firm*—Nixon & Vanderhye P.C.

(57) ABSTRACT

The invention aims at providing a display which can improve viewing angle dependency of contrast ratio in a wide azimuth without changing design of a basic structure of a display element, impairing display quality in a direction showing large contrast ratio and being limited to a state of displaying white or black. The aim is attained by a display comprising: a display element having viewing angle dependency of contrast ratio; and an anisotropic scattering film having an anisotropic scattering layer, wherein the anisotropic scattering film has a scattering central axis approximately parallel to a direction showing the largest contrast ratio of the display element and is located on a viewing screen side of the display element.

10 Claims, 24 Drawing Sheets

FOREIGN PATENT DOCUMENTS

| | | |
|---|---|---|
| JP | 64-40906 | 2/1989 |
| JP | 64-77001 | 3/1989 |
| JP | 1-147405 | 6/1989 |
| JP | 1-147406 | 6/1989 |
| JP | 2-51101 | 2/1990 |
| JP | 2-54201 | 2/1990 |
| JP | 2-67501 | 3/1990 |
| JP | 3-87701 | 4/1991 |
| JP | 3-109501 | 5/1991 |
| JP | 6-9714 | 1/1994 |
| JP | 7-64069 | 3/1995 |
| JP | 9-127331 | 5/1997 |
| JP | 2000-180833 | 6/2000 |
| JP | 2003-202415 A | 7/2003 |

\* cited by examiner

ANISOTROPIC SCATTERING FILM FOR IMPROVING THE VIEWING ANGLE DEPENDENCY OF A LIQUID CRYSTAL DISPLAY

CROSS-REFERENCE TO RELATED APPLICATION

This Nonprovisional application claims priority under 35 U.S.C §119 (a) on Patent Application No. 2005-273746 filed in Japan on Sep. 21, 2005 and Patent Application No. 2006-247067 filed in Japan on Sep. 12, 2006, the entire contents of which are hereby incorporated by reference.

BACKGROUND OF THE INVENTION

1. Field of the Invention

The present invention relates to a display and more specifically to a display such as a liquid crystal display and the like, which includes an anisotropic scattering film.

2. Description of the Related Art

As a typical example of a display in which there is the dependency of display performance on the viewing angle (a viewing angle characteristic), a liquid crystal display typified by a twisted nematic (TN) mode is known. Incidentally, the term "there is the dependency of display performance on the viewing angle" means that display performance such as a contrast ratio, a gradation characteristic and chromaticity differs between the cases of viewing from the front (the direction of the normal to a viewing screen of the display, the direction of a viewing angle of 0°) and viewing obliquely (the direction in which a viewing angle is larger than 0°). Generally, it is known that these display performance in the case of viewing obliquely is inferior to that in the case of viewing from the front.

In a TN mode liquid crystal display, a contrast ratio decreases gradually as the viewing angle is increased in a vertical or horizontal direction (three, six, nine or twelve o'clock direction). For example, even when a contrast ratio is 320 in viewing from the front, a contrast ratio is 10 in viewing at angle of 75° in an upper direction (twelve o'clock direction), in viewing at viewing angle of 50° in a lower direction (six o'clock direction), in viewing at angle of 65° in a left direction (nine o'clock direction), and in viewing at angle of 68° in a right direction (three o'clock direction). In addition, a display color is neutral (not tinged) in viewing in the front direction but it is tinged with yellow in viewing in the upper, lower, left or right direction. Particularly, in the case of viewing in the lower direction, an abnormal phenomenon of a gradation characteristic referred to as a gradation reversal, in which a display image looks reverse in video, may be observed. Such the viewing angle dependency of display performance in a liquid crystal display results from the optical anisotropy of components such as anisotropy of the refractive index of a liquid crystal molecule, a polarization absorption property and a polarization transmission property of a polarizing plate and the like and it is said that the viewing angle dependency of display performance is a property inherent in the liquid crystal display.

As a method of improving the viewing angle dependency of the display performance of a liquid crystal display, various methods have been proposed. As such methods, for example, a pixel division method (there are a Half Tone Gray Scale method in which a pixel is split into multiple sections and voltages applied to pixels are changed in certain proportions and a Domain Division method in which a pixel is split into multiple domains and liquid crystal alignment is controlled separately in each domain), display modes such as an In-Plane Switching (IPS) mode in which an electric field is applied to a liquid crystal laterally, a Multi-domain Vertical Alignment (MVA) mode in which a liquid crystal being vertically aligned when an voltage is not applied is driven and an Optically Compensated Birefringence (OCB) mode in which a bend aligned cell and a retardation film are combined, and an optical compensation method using the retardation film are proposed, and it is also investigated to use these methods appropriately in combination and many liquid crystal displays which have been commercialized employ these methods.

However, in these methods, there were rooms for improvement in that when the pixel division method or the above-mentioned display mode is employed, it is necessary to modify an alignment layer, a structure of an electrode and the like and establishment of the production technology and installation of the production facilities for this modification are required, and this results in the difficulties in production and the high cost. In addition, its effect of improving the viewing angle dependency is not sufficient. Further, also in the optical compensation method using the retardation film, its effect of improving the viewing angle dependency is limited. For example, since the most suitable value of phase difference for compensating a phase difference of a liquid crystal cell varies between the cases of displaying white and black, it is impossible to compensate a phase difference of a liquid crystal cell in both display of white and display of black by the optical compensation method. In addition, there was a room for improvement in that a compensation effect of the retardation film is not attained at all in the axial azimuths of the polarization axes (transmission axis and absorption axis) of a polarizing plate in principle and an effect of improvement is limited to the range of specified azimuth angles.

As a method of improving the viewing angle dependency of the display performance of a liquid crystal display besides the above methods, a method of providing a scattering film on the viewing screen side of a the liquid crystal display element to level the outgoing lights is known. This method can be applied to all display modes and modification of a structure of a display cell is basically unnecessary. In addition, it is possible to attain an effect in both states of displaying white and black as opposed to the optical compensation method using the above retardation film and its effect does not disappear in the azimuths parallel to the polarization axes of a polarizing plate.

In addition, as a light source of a commonly used liquid crystal display, a diffusion backlight system emitting diffused lights is employed. Since most of liquid crystal display modes or polarizing plates show best properties for vertical incident lights, lights from the diffusion backlight system is collimated as far as possible by a lens film or the like and is vertically inputted into a liquid crystal display element (a liquid crystal cell). Thereby, a furthermore effect of improving the viewing angle dependency can be attained and therefore many technologies concerning this diffusion backlight system are proposed.

However, since a method of obtaining collimated lights simply and efficiently has not been yet established, a method of an improvement in the viewing angle dependency by a scattering film is employed practically in combination with a diffusion backlight system as described above. In this case, an effect of improving the viewing angle dependency can be attained as described above, but there was a room for improvement in that light leakage increases in the front direction and the contrast ratio in the front direction is reduced by a large amount since a part of leaked light obliquely entering and exiting the liquid crystal cell is angled to the front direction by the scattering film in a state of displaying black. This is caused because the scattering property of the scattering film to transmitted light does not varies so much even when changing the incidence angle more or less due to the isotropic scattering performance of the scattering film.

For theses situations, light control plates fabricated by irradiating ultraviolet light from a linear light source within a prescribed angular range, to a resin composition consisting of a plurality of compounds, each of which has a refractive index differing from one another and one or more photopolymerizable carbon-carbon double bonds in a molecule and by curing the resin composition are disclosed in Japanese Kokai Publication Sho-63-309902, Japanese Kokai Publication Sho-64-40903, Japanese Kokai Publication Sho-64-40905, Japanese Kokai Publication Sho-64-40906, Japanese Kokai Publication Sho-64-77001, Japanese Kokai Publication Hei-1-147405, Japanese Kokai Publication Hei-1-147406, Japanese Kokai Publication Hei-2-51101, Japanese Kokai Publication Hei-2-54201, Japanese Kokai Publication Hei-2-67501, Japanese Kokai Publication Hei-3-87701, Japanese Kokai Publication Hei-3-109501 and Japanese Kokai Publication Hei-6-9714, and liquid crystal displays fitted with such light control plates are disclosed in Japanese Kokai Publication Hei-7-64069 and Japanese Kokai Publication No. 2000-180833. These light control plates selectively scatters light entering at a specific angle. Accordingly, it is thought that the reduction in the contrast ratio in the front direction described above can be resolved to some extent by use of this light control plate.

However, it is thought that as shown in FIG. 30, in this resin cured article of the light control plate 50, plate-like regions 40 having refractive indexes different from those of surrounding regions are formed in parallel with one another in conformity with the length direction of a linear light source 51 being located above the light control plate 50 in fabricating the light control plate 50. Thus, when the light control plate 50 is rotated about the A-A axis along which the plate-like regions 40 alternately appear, the incidence angle dependency of the scattering property which the light control plate 50 exhibits is little recognized, but when the light control plate 50 is rotated about the B-B axis along which the refractive index does not change and is uniform, the incidence angle dependency of the scattering property is recognized.

FIG. 31 is a schematic diagram showing the incidence angle dependency of the scattering property which the light control plate 50 in FIG. 30 exhibits. A vertical axis represents a linear transmitting light quantity being an indicator of a degree of scattering. A horizontal axis represents an incidence angle. A solid line and a broken line in FIG. 31 represents the case of rotating the light control plate 50 about the A-A axis and B-B axis in FIG. 30, respectively. In addition, the plus and minus signs of the incidence angle represent the directions of rotation.

The linear transmitting light quantity expressed by the solid line in FIG. 31 is small and nearly constant in both of a front direction and an oblique direction. This means that the light control plate 50 is in a state of scattering irrespective of the incidence angle in rotating the light control plate 50 about the A-A axis. In addition, the linear transmitting light quantity expressed by the broken line in FIG. 31 becomes smaller in the direction close to incidence angle of 0°. This means that the light control plate 50 is also in a state of scattering for light in a front direction in rotating the light control plate 50 about the B-B axis. Further, in the directions where the incidence angle is large, the linear transmitting light quantity expressed by the broken line in FIG. 31 increases. This means that the light control plate 50 is in a state of transmitting for light in an oblique direction in rotating the light control plate 50 about the B-B axis.

Thus, in the previous light control plate, reduction in the contrast ratio in the front direction can be somewhat prevented, but there was a room for improvement in that an effect of improving the viewing angle dependency can be attained only in a specific azimuth since an anisotropic scattering property (a property in which the scattering property varies when an incidence angle is changed) can be attained only in a specific azimuth.

SUMMARY OF THE INVENTION

In view of the above state of the art, it is an object of the present invention to provide a display which can improve viewing angle dependency of contrast ratio in a wide azimuth without changing design of a basic structure of a display element, impairing display quality in a direction showing large contrast ratio and being limited to a state of displaying white or black.

The present inventors made various investigations concerning a display comprising a display element having viewing angle dependency of contrast ratio and an anisotropic scattering film having an anisotropic scattering layer, and consequently have noted a scattering property of the anisotropic scattering film having a scattering central axis. The anisotropic scattering film having the scattering central axis exhibits an anisotropic scattering property (a property in which the scattering property varies when an incidence angle is changed) being approximately symmetric about the scattering central axis. And so, the inventors found that by locating this anisotropic scattering film on the viewing screen side of the display element in such a way that an axial direction of the scattering central axis is approximately parallel to the direction showing the largest contrast ratio of the display element, incident light (mainly, white luminance) from the direction showing the largest contrast ratio of the display element can be scattered (diffused) in all directions and leveled, and thereby the viewing angle dependency of contrast ratio can be improved in a wider azimuth than ever before. In addition, the inventors found that in this time, since incident light in a direction showing low contrast ratio of the display element is scattered weakly by the anisotropic scattering film, it is possible to inhibit display quality in the direction showing the largest contrast ratio from deteriorating due to scattering of incident light in the direction showing low contrast ratio of the display element.

In addition, in ordinary display elements, display performance such as a gamma curve, chromaticity and the like is optimally designed in the direction showing the largest contrast ratio of the display element. Therefore, the inventors found that in accordance with the display of the present invention, the viewing angle dependency of display performance such as a gamma curve, chromaticity and the like can also be improved, specifically in the azimuth showing a narrow viewing angle of the display element. Further, the inventors found that the display of the present invention can realize high display quality, since the anisotropic scattering film having the scattering central axis exhibits the anisotropic scattering property in any azimuth as opposed to a previous anisotropic scattering film exhibiting an anisotropic scattering property only in a specific azimuth and operates appropriately without being limited to a state of displaying white or black as opposed to a retardation film. In addition, the inventors found that because of a mechanism of the present invention, the above effect of improving the viewing angle dependency of display performance could be attained for any display elements having viewing angle dependency of contrast ratio without changing design of a basic structure of the display element. By these findings, the above-mentioned problem can be resolved and the inventors have now led to completion of the present invention.

That is, the present invention pertains to a display comprising:

a display element having viewing angle dependency of contrast ratio; and an anisotropic scattering film having an anisotropic scattering layer, wherein the anisotropic scattering film has a scattering central axis approximately parallel to a direction showing the largest contrast ratio of the display element and is located on the viewing screen side of the display element.

DESCRIPTION OF SYMBOLS

Figure 1A:
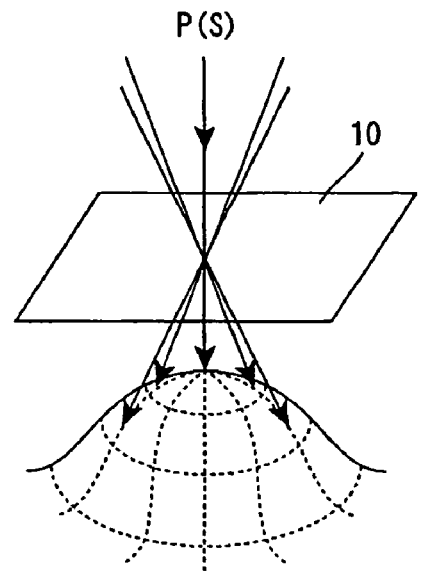
FIG. 1A is a perspective schematic diagram showing a scattering property of an anisotropic scattering film constituting a display of the present invention, wherein a letter P represents a direction in which an incidence angle is 0°, S represents a scattering central axis, P(S) indicates that a direction in which an incidence angle is 0° is coincident with an axial direction of the scattering central axis, and length of an arrow extending from a point of intersection of the scattering central axis and the anisotropic scattering film up to a curved surface in bell form (indicated by a broken line in the drawing) represents a linear transmitting light quantity in each direction.

3: Polarizer film
3a: Polarizing element
4: Wide View (WV) film
10: Anisotropic scattering film
10a: First anisotropic scattering film
10b: Second anisotropic scattering film
10c: Third anisotropic scattering film
11: Display element
11a: VA mode liquid crystal cell
11b: TN mode liquid crystal cell
11c: IPS mode liquid crystal cell
12a: First retardation film
12b: Second retardation film
12c: Third retardation film
12d: Fourth retardation film
12e: Fifth retardation film
12f: Sixth retardation film
12g: Seventh retardation film
12h: Eighth retardation film
12j: Ninth retardation film
13a: First polarizing plate
13b: Second polarizing plate
13c: Third polarizing plate
13e: Fifth polarizing plate
13f: Sixth polarizing plate
13g: Seventh polarizing plate
13h: Eighth polarizing plate
13i: Polarizing plate with WV film
13j: Ninth polarizing plate
15a: VA mode liquid crystal display element
15b: TN mode liquid crystal display element
15c: IPS mode liquid crystal display element
20: Region having refractive index different from those of surrounding regions
30: Optical receiver
40: Plate-like region having refractive index different from those of surrounding regions
50: Light control plate
51: Linear light source
100a: VA mode liquid crystal display
100b: TN mode liquid crystal display
100c: IPS mode liquid crystal display
a: Absorption axis
b: Incline direction (direction of alignment control of discotic liquid crystal within WV film)
C: Isostere of linear transmitting light quantity
d: Direction of alignment control of liquid crystal within liquid crystal cell
s: Slow axis
S: Scattering central axis
$S_1$: Axial azimuth of scattering central axis

DETAILED DESCRIPTION OF THE PREFERRED EXAMPLES

Hereinafter, the present invention will be described in detail.

The display element has viewing angle dependency of contrast ratio. In addition, in the present description, the display element is not particularly limited as long as it is an element for displaying and it includes, for example, a liquid crystal display element. Contrast ratio is one of display performance of the display element and is generally represented by a value obtained by dividing a maximum luminance by a minimum luminance. Viewing angle dependency means that display performance of display element differs between the cases of viewing from the front (a direction of the normal to a viewing screen of the display, a direction in which a viewing angle is 0°) and viewing obliquely (a direction in which a viewing angle is larger than 0°). Therefore, "The contrast ratio has the viewing angle dependency," means that the contrast ratio differs between the cases of viewing from the front and viewing obliquely. Further, generally, the closer to the front direction a viewing direction is, the larger the contrast ratio of the display is, but the reverse state may be feasible.

The anisotropic scattering film has the anisotropic scattering layer. Incidentally, in the present description, the anisotropic scattering layer is not particularly limited as long as it exhibits an anisotropic scattering property (a property in which the scattering property varies when an incidence angle is changed) in at least one azimuth. Azimuth is a direction in plane with the film surface of the anisotropic scattering film or the viewing screen of the display element and represented by azimuth angle Φ (0°≦Φ<360°). In the present description, a direction having an azimuth angle of Φ and a polar angle of −Θ is coincident with a direction having an azimuth angle of Φ+180° (an azimuth opposite to an azimuth having azimuth angle of Φ) and an polar angle of Θ. In the present description, generally, by setting a polar angular range to 0° or more, an azimuth having an azimuth angle of Φ is distinguished from an azimuth having an azimuth angle of Φ+180° and each direction is represented by specifying an azimuth angle Φ (0°≦Φ<360°) and a polar angle Θ (0°≦Θ<90°). Incidence angle is represented by an angle formed by a direction of the normal to the film surface of the anisotropic scattering film, and an incidence direction of light. Polar angle is represented with reference to the direction of the normal to the film surface of the anisotropic scattering film or the viewing screen of the display element (the direction in which polar angle is 0°). An example of the form of the anisotropic scattering film includes the form in which the anisotropic scattering film consists of only the anisotropic scattering layer, the form in which a transparent substrate is laminated on one side (a viewing screen side or a backside) of the anisotropic scattering layer, and the form in which a transparent substrates are laminated on both sides (a viewing screen side and a backside) of the anisotropic scattering layer. Further, the anisotropic scattering layer may takes on a single layer structure or a multi layer structure.

As the transparent substrate, a more transparent substrate is preferred. Therefore, the total luminous transmittance (JIS K 7361-1) of the transparent substrate is preferably 80% or more, more preferably 85% or more, and furthermore preferably 90% or more. In addition, the haze value (JIS K 7136) of the transparent substrate is preferably 3.0 or less, more preferably 1.0 or less, and furthermore preferably 0.5 or less. The transparent substrate includes a transparent plastic film and glass plate, but the plastic film is preferred in that it is a low profile and lightweight and it is superior in impact resistance and productivity. A material of the plastic film includes polyethylene terephthalate (PET), polyethylene naphthalate (PEN), triacetylcellulose (TAC), polycarbonate (PC), polyallylate, polyimide (PI), aromatic polyamide, polysulfone (PS), polyether sulfone (PES), cellophane, polyethylene (PE), polypropylene (PP), polyvinyl alcohol (PVA) and cyclo olefin. The form of the plastic film includes the form in which the plastic film consists of a film formed by processing the material singly or a mixture of the materials and the form in which the plastic film consists of a laminate of the film formed as above mentioned. The thickness of the transparent substrate is preferably 1 μm to 5 mm in consideration of the uses and productivity of the transparent substrate, more preferably 10 to 500 μm, and furthermore preferably 50 to 150 μm.

In the present invention, the anisotropic scattering film has the scattering central axis. Incidentally, in the present description, the scattering central axis refers to an axis about which an anisotropic scattering property shows approximate symmetry and the anisotropic scattering film having the scattering central axis exibits the anisotropic scattering property in all azimuths. Accordingly, the scattering property of the anisotropic scattering film can not be designated uniquely, but when a linear transmitting light quantity is used as the indicator of the scattering property, the linear transmitting light quantity varies approximately symmetrically about the scattering central axis with respect to the anisotropic scattering film constituting the display of the present invention. In addition, the linear transmitting light quantity refers to a light quantity of collimated lights exiting in the same direction as that of incident light when collimated lights having a prescribed light quantity enter the anisotropic scattering film. The method of measuring the linear transmitting light quantities includes, for example, a method shown in FIG. 4. In the method shown in FIG. 4, an optical receiver 30 is secured at a position to receive light traveling in straight from a light source (not shown) and a specimen 10 is located between the light source and the optical receiver 30. In accordance with this method, the linear transmitting light quantity can be measured at varying incidence angle in an M-M azimuth (an azimuth of measurement) perpendicular to an L-L axis (a rotation axis) in plane with a film surface by rotating the specimen 10 about the L-L axis, for example. Further, changing the rotation axis can appropriately modify the azimuth of measurement. Therefore, in accordance with this method, the linear transmitting light quantities in various directions can be measured. Incidentally, as the optical receiver 30, for example, a goniophotometer can be employed.

The anisotropic scattering film has the scattering central axis approximately parallel to the direction showing the largest contrast ratio of the display element and is located on the viewing screen side of the display element. In accordance with this constitution, since the direction showing the largest contrast ratio of the display element and the axial direction of the scattering central axis of the anisotropic scattering film are approximately parallel, incident light in the direction showing the largest contrast ratio of the display element can be selectively scattered in all directions and leveled and therefore the viewing angle dependency of the contrast ratio can be improved in a wide azimuth. In addition, in this time, since light in the direction showing a low contrast ratio of the display element is scattered weakly and most of the light can pass through the film, it is possible to inhibit the display quality in the direction showing the largest contrast ratio of the display element from deteriorating due to the scattering of incident light in the direction showing the low contrast ratio of the display element.

In addition, in ordinary display elements, it is thought that the direction showing the largest contrast ratio is the best direction for the display performance and the display performance such as a gamma curve, chromaticity and the like is optimally designed in this direction. Therefore, in accordance with the present invention, generally, the viewing angle dependency of display performance such as a gamma curve, chromaticity and the like besides the viewing angle dependency of the contrast ratio can also be improved, specifically in the azimuth showing a narrow viewing angle of the display element. Further, the display of the present invention can realize high display quality since the anisotropic scattering film constituting the display of the present invention exhibits the anisotropic scattering property in any azimuth as opposed to a previous an isotropic scattering film exhibiting an anisotropic scattering property only in a specific azimuth and operates appropriately without being limited to a state of displaying white or black as opposed to a retardation film. In addition, because of the mechanism of the present invention, the operation and effect of the present invention of the improvement in the viewing angle dependency can be attained for any display elements having viewing angle dependency of the contrast ratio without changing the design of the basic structure of the display element.

In addition, the term "a state of being approximately parallel" includes not only a state of being perfectly parallel but also a state which can be considered to be equivalent to a state of being parallel in view of the operation and effect of the present invention. In addition, the direction showing the largest contrast ratio of the display element is usually approximately parallel with the direction of the normal to the viewing screen of the display element but it does not have to be parallel with it. Further, the arrangement of the anisotropic scattering film and the display element is not particularly limited but the anisotropic scattering film is preferably bonded to the display element. The method of bonding the anisotropic scattering film to the display element is not particularly limited and includes, for example, a method of using an adhesive and a method of using a pressure sensitive adhesive. In addition, the linear transmitting light quantity in the axial direction of the scattering central axis is preferred to be low from the viewpoint of effectively attaining the operation and effect of the present invention.

The display of the present invention may or may not comprise another constituents as long as it comprises the display element and the anisotropic scattering film as constituent and its constitution is not particularly limited.

Hereinafter, the preferred embodiment of the display of the present invention will be described in detail.

Figure 2A:
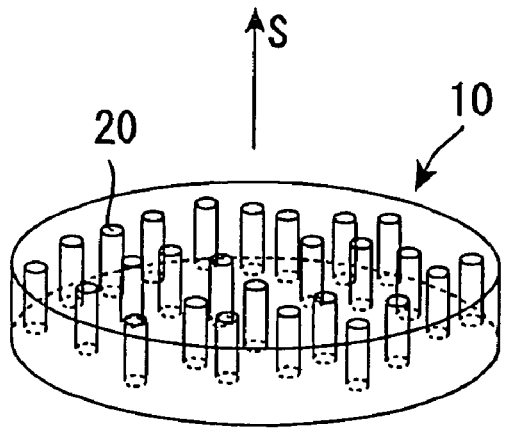
FIG. 2A is a perspective schematic diagram showing a structure of a first anisotropic scattering film (anisotropic scattering layer) constituting a display of the present invention.
Figure 2B:
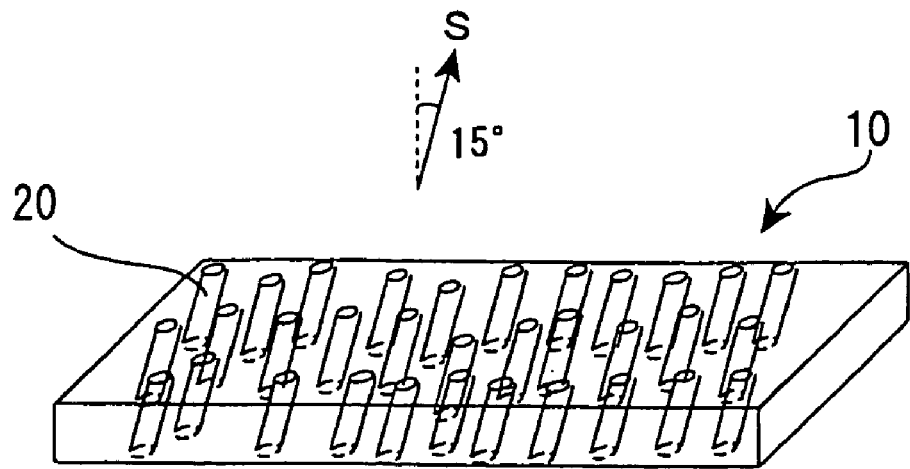
FIG. 2B is a perspective schematic diagram showing a structure of a second anisotropic scattering film (anisotropic scattering layer) constituting a display of the present invention, wherein a dotted line represents a direction of the normal to a film surface of the second anisotropic scattering film.
Figure 2C:
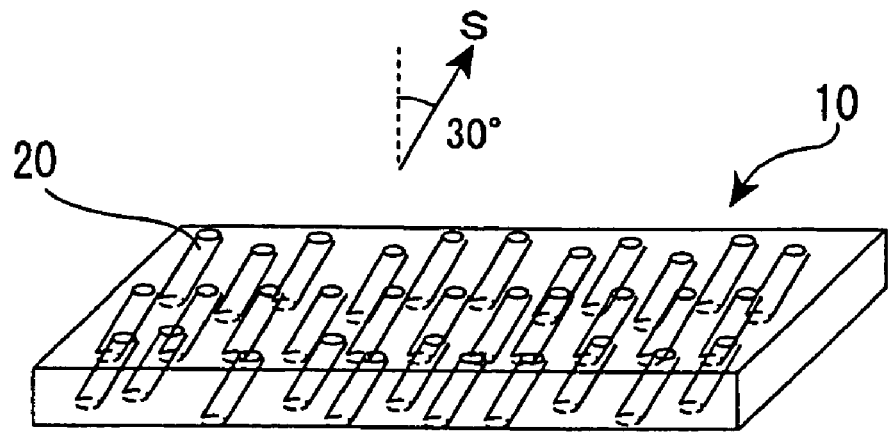
FIG. 2C is a perspective schematic diagram showing a structure of a third anisotropic scattering film (anisotropic scattering layer) constituting a display of the present invention, wherein a dotted line represents a direction of the normal to a film surface of the third anisotropic scattering film.

The anisotropic scattering layer is preferably formed by curing a composition containing a photo-curable compound. In accordance with this manner, the anisotropic scattering film exhibiting the above-mentioned anisotropic scattering property or the anisotropic scattering film exhibiting the anisotropic scattering property in any azimuth can be produced simply. By the way, when the cross section of the anisotropic scattering layer formed by curing the composition containing the photo-curable compound is observed with a microscope, a fine structure extending, for example, in the thickness direction is recognized. Therefore, it is thought that as shown in FIGS. 2A to 2C, many minute rod-shaped cured regions 20, of which the refractive index is slightly different from those of surrounding regions and the extending direction is coincident with the axial direction of the scattering central axis S, are formed within the anisotropic scattering layer 10 and it is thought that the above-mentioned anisotropic scattering property is exerted resulting from such an internal structure of the anisotropic scattering layer 10. In addition, in FIGS. 2A to 2C, the shape of the rod-shaped cured regions 20 is shown as a cylindrical column but it is not particularly limited. In addition, in FIGS. 2A, as one of the preferred form, the rod-shaped cured regions 20 extend in the thickness direction of the anisotropic scattering layer 10, but the extending direction of the rod-shaped cured regions 20 is not limited as same as the scattering central axis. In addition, the shape of the anisotropic scattering layer is shown as a sheet in FIGS. 2A to 2C but it is not particularly limited.

The form of the composition containing the photo-curable compound includes (A) the form in which the composition contains a photopolymerizable compound alone, (B) the form in which the composition contains a plurality of photopolymerizable compounds in a mixture, and (C) the form in which the composition contains a single or a plurality of photopolymerizable compounds and a high polymer resin not having a photopolymerizing property in a mixture. It is thought that in all of the above forms (A), (B) and (C), minute structures of the order of microns having refractive indexes different from those of surrounding regions are formed in the anisotropic scattering layer by light irradiation as described above and therefore the incidence angle dependency of the linear transmitting light quantity can be exerted.

Accordingly, in the above form (A), as the photopolymerizable compound, the compound of which the refractive index changes by a large amount before and after photopolymerization is preferred. In addition, in the above forms (B) and (C), as the photopolymerizable compound, the substance formed by combining a plurality of materials having different refractive indexes is preferred. Further, the change of the refractive index and differences between the refractive indexes is preferably 0.01 or more, more preferably 0.05 or more, and furthermore preferably 0.10 or more from the viewpoint of effectively attaining the operation and effect of the present invention.

Further, the photo-curable compound preferably includes a photopolymerizable compound of polymer, oligomer or monomer, having a radically polymerizable or a cationic polymerizable functional group, and a photopolymerization initiator and has a property of polymerizing and curing by irradiating ultraviolet light and/or visible light.

The radically polymerizable compound principally contains one or more unsaturated double bonds in a molecule, and it includes, specifically, acrylic oligomers such as epoxy acrylate, urethane acrylate, polyester acrylate and silicone acrylate, and acrylate monomers such as 2-ethylhexyl acrylate, phenoxyethyl acrylate, isonorbornyl acrylate, 2-hydroxyethyl acrylate, 2,2,2-trifluoroethyl methacrylate, 2-perfluorooctyl-ethylacrylate, triethyleneglycol diacrylate, 1,6-hexanediol diacrylate, 1,9-nonanediol diacrylate, trimethylolpropane triacrylate, ethylene oxide (EO) modified trimethylolpropane triacrylate, pentaerythritol triacrylate, pentaerythritol tetraacrylate and dipentaerythritol hexaacrylate.

As the cationic polymerizable compound, a compound containing one or more epoxy groups, vinyl ether groups, and/or oxetane groups in a molecule can be used. The compound containing an epoxy group in a molecule includes diglycidyl ethers of bisphenols such as bisphenol A, hydrogenated bisphenol A, bisphenol F, bisphenol AD, bisphenol S, tetramethylbisphenol A, tetramethylbisphenol F, tetrachlorobisphenol A and tetrabromobisphenol A, polyglycidyl ethers of novolak resin such as phenol novolac, cresol novolac, phenol novolac bromide and o-cresol novolac, diglycidyl ethers of alkylene glycols such as ethylene glycol, butanediol, 1,6-hexanediol, neopentyl glycol, trimethylolpropane and ethylene oxide (EO) adduct of bisphenol A, and glycidyl esters such as glycidyl ester of hexahydrophthalic acid and glycidyl ester of dimer acid. Further, alicyclic epoxy compounds such as 3,4-epoxycyclohexanemethyl-3',4'-epoxycyclohexylcarboxylate, oxetane compounds such as 1,4-bis[(3-ethyl-3-oxetanylmethoxy)methyl]benzene and 3-ethyl-3-(hydroxymethyl)-oxetane, and vinyl ether compounds such as diethylene glycol divinyl ether and trimethylolpropane trivinyl ether can also be used.

The photopolymerizable compound is not limited to the compounds described above. In addition, in order to produce adequate difference between the refractive indexes, into the photopolymerizable compound, a fluorine atom (F) may be introduced for reducing the refractive index and a sulfur atom (S), a bromine atom (Br) or various metal atoms may be introduced for enhancing the refractive index. Further, in order to enhance the refractive index of the anisotropic scattering layer, it is effective to add the ultra-fine functional particle formed by introducing a photopolymerizable functional group such as an acrylic group and an epoxy group on the surface of an ultra-fine particle consisting of metal oxide having a high refractive index such as titanium oxide ($TiO_2$), zirconium oxide ($ZrO_2$), tin oxide ($SnO_2$) and the like, to the photopolymerizable compound.

A photopolymerization initiator which can polymerize the radically polymerizable compound includes, for example, benzophenone, 2,4-diethylthioxanthone, benzoinisopropyl ether, 2,2-diethoxyacetophenone, benzyl dimethyl ketal, 2,2-dimethoxy-1,2-diphenylethane-1-one, 2-hydroxy-2-methyl-1-phenylpropane-1-one, 1-hydroxycyclohexylphenyl ketone, 2-methyl-1-[4-(methylthio)phenyl]-2-morpholinopropane-1,1-[4-(2-hydroxyethoxy)-phenyl]-2-hydroxy-2-methy-1-propane-1-one, bis(cyclopentadienyl)-bis(2,6-difluoro-3-pyru-1-yl)titanium, and 2-benzyl-2-dimethylamino-1-(4-morpholinophenyl)-butanone-1,2,4,6-trimethylbenzoyldiphenylphosphine oxide.

A photopolymerization initiator which can polymerize the cationic polymerizable compound is a compound which produce acid by light irradiation and can polymerize the above cationic polymerizable compound with the produced acid. Generally, onium salt and a metallocene complex are suitably used. As the onium salt, diazonium salt, sulfonium salt, iodonium salt, phosphonium salt, and selenium salt are used and as a counter ion, anions such as tetrafluoroboric acid ion ($BF_4^-$), hexafluorophosphoric acid ion ($PF_6^-$), hexafluoroarsenic acid ion ($AsF_6^-$) and hexafluoroantimonic acid ion ($SbF_6^-$) are used. A photopolymerization initiator of the cationic polymerizable compound includes triphenylsulfonium-hexafluoro antimonate, triphenylsulfonium-hexafluoro phosphate, (4-methoxyphenyl)phenyliodonium-hexafluoro antimonate, bis(4-t-butylphenyl)iodonium-hexafluoro phosphate, and ($\eta$5-isopropylbenzene) ($\eta$5-cyclopentadienyl)iron (II)-hexafluoro phosphate.

By the way, the photopolymerization initiator is preferably mixed in an amount 0.01 parts by weight or more and 10 parts by weight or less with respect to 100 parts by weight of the photopolymerizable compound. The reason for this is that when an amount of the photopolymerization initiator is less than 0.01 parts by weight, photo-curability may be deteriorated and when it is more than 10 parts by weight, only the surface of the compound may be cured and the internal curability may be deteriorated. The photopolymerization initiator is more preferably mixed in an amount 0.1 parts by weight or more and 7 parts by weight or less with respect to 100 parts by weight of the photopolymerizable compound, further more preferably 0.1 parts by weight or more and 5 parts by weight or less.

As the composition containing a photo-curable compound, a high polymer resin not having a photopolymerizing property can be used together with the photopolymerizable compound (refer to the above form (C)). The high polymer resin includes acrylic resin, styrene resin, styrene-acryl copolymer, polyurethane resin, polyester resin, epoxy resin, cellulose-based resin, vinyl acetate resin, vinyl chloride-vinyl acetate copolymer, and polyvinyl butyral resin. These high polymer resins need to have adequate compatibility with the photopolymerizable compounds before photopolymerization, and various organic solvents and plasticizers can be used in order to secure such compatibility. Incidentally, when acrylate is used as the photopolymerizable compound, the high polymer resin is preferably selected from acrylic resins from the viewpoint of the compatibility.

A method of curing the composition containing a photo-curable compound is not particularly limited and it includes, for example, a method in which the composition is provided in the form of sheet on a substrate and collimated light (ultraviolet light, for example) is irradiated from a prescribed angle to this composition. Thereby, clusters of a plurality of rod-shaped cured regions (for example, refer to FIGS. 2A to 2C) extending in parallel to the direction of collimated light irradiation can be formed.

As the method of providing the above composition in the form of sheet on a substrate, usual coating method or printing method can be employed. Specifically, coating method such as air doctor coating, bar coating, blade coating, knife coating, reverse roll coating, transfer roll coating, gravure roll coating, kiss roll coating, cast coating, spray coating, slot orifice coating, calendar coating, dam coating, dip coating and die coating, and printing method such as intaglio printing method like gravure printing and stencil printing method such as screen printing can be employed. Further, when the viscosity of the composition is low, a method, in which a structure having a prescribed height is provided on a peripheral area of a substrate and the liquid composition is applied to an area surrounded this structure, can also be employed.

As a light source used for irradiating the collimated light (ultraviolet light, for example), a short arc type ultraviolet lamp is normally used and specifically a high pressure mercury lamp, a low pressure mercury lamp, a metahalide lamp, and a xenon lamp can be used. An apparatus used for irradiating collimated light (ultraviolet light, for example) from a prescribed angle is not particularly limited but a exposure system for resist exposure is preferably used from the viewpoint that collimated light (ultraviolet light, for example) with uniform intensity can be irradiated to a given area and the exposure system can be selected from a commercially available system. In addition, when an anisotropic scattering layer with small size is formed, a method, in which an ultraviolet spot light source is used as a point source and ultraviolet light is irradiated from an adequate distance, can also be employed.

The collimated light irradiated to the substance obtained by processing the above composition containing the photo-curable compound in the form of sheet needs to include a wavelength by which a photopolymerizable compound can be polymerized and cured, and generally, the light with a wavelength around 365 nm of a mercury lamp are employed. When the anisotropic scattering layer is formed using light of this wavelength range, the illuminance of irradiation is preferably 0.01 mW/cm$^2$ or more and 100 mW/cm$^2$ or less. When the illuminance is less than 0.01 mW/cm$^2$, the production efficiency may be deteriorated since a curing time becomes long, and when it is more than 100 mW/cm$^2$, a curing rate of the photopolymerizable compound is too fast and a structure formation does not occur and therefore it may be impossible to develop a desired anisotropic scattering property. The illuminance is more preferably 0.1 mW/cm$^2$ or more and 20 mW/cm$^2$ or less.

Figure 3:
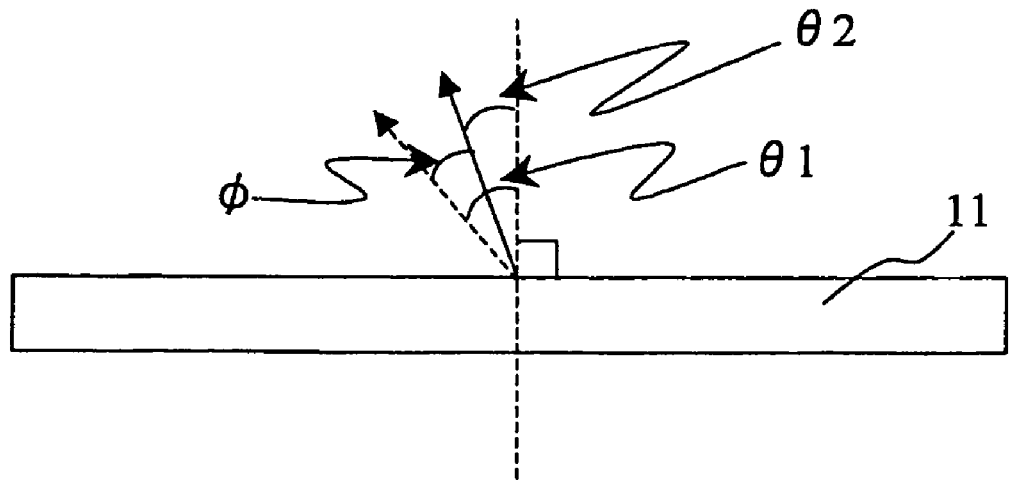
FIG. 3 is a view illustrating a relationship among an axial direction of a scattering central axis of an anisotropic scattering film, a direction showing the largest contrast ratio of a display element, and a direction of the normal in the display of the present invention.

FIG. 3 is a view illustrating a relationship among the axial direction of the scattering central axis of the anisotropic scattering film, the direction showing the largest contrast ratio of the display element, the direction of the normal to the viewing screen of the display element, and the direction of the normal to the film surface of the anisotropic scattering film. Further, in this drawing, a dotted line represents both the direction of the normal to the viewing screen of the display element 11 and the direction of the normal to the film surface of the anisotropic scattering film (hereinafter, referred to as just "the direction of the normal"). An arrow by a solid line represents the direction showing the largest contrast ratio of the display element 11. An arrow by a broken line represents the axial direction of the scattering central axis of the anisotropic scattering film (not shown). $\theta1$ represents the angle formed by the direction of the normal and the axial direction of the scattering central axis of the anisotropic scattering film. $\theta2$ represents the angle formed by the direction of the normal and the direction showing the largest contrast ratio of the display element 11. $\phi$ represents the angle formed by the axial direction of the scattering central axis of the anisotropic scattering film and the direction showing the largest contrast ratio of the display element 11.

Hereinafter, the present invention will be described, taken in conjunction with FIG. 3, but the display of the present invention is not limited to the constitution shown in FIG. 3.

The angle ($\phi$) formed by the axial direction of the scattering central axis and the direction showing the largest contrast ratio of the display element is preferably 15° or less. When the angle ($\phi$) is more than 15°, the largest contrast ratio may be deteriorated and the effect of improvement in the viewing angle dependency of the contrast ratio may not be attained in a wide azimuth. That is, by setting the angle ($\phi$) 15° or less, the effect of improvement in the viewing angle dependency of the contrast ratio can be attained in a wide azimuth while inhibiting the largest contrast ratio from deteriorating.

The angle (φ) formed by the axial direction of the scattering central axis and the direction showing the largest contrast ratio of the display element is more preferably 10° or less. Thereby, the viewing angle dependency of the contrast ratio can be improved in a wider azimuth while better inhibiting the largest contrast ratio from deteriorating. In order to attain this effect more or attain this effect equally in a wide azimuth, the angle (φ) formed by the axial direction of the scattering central axis and the direction showing the largest contrast ratio of the display element is furthermore preferably 5° or less. Usually, the scattering central axis is inclined from the direction of the normal to the film surface of the anisotropic scattering film by θ1 (θ1≧0°). And, in most of the display elements such as a liquid crystal display element and the like, the angle θ2 formed by the direction showing the largest contrast ratio and the direction of the normal to the viewing screen of the display element is 10° or less, and the anisotropic scattering film is located with its film surface parallel to the viewing screen of the display element. Therefore, the angle θ1 formed by the axial direction of the scattering central axis and the direction of the normal to the film surface of the anisotropic scattering film is preferably 20° or less.

The anisotropic scattering film preferably has the scattering central axis in a direction forming a smaller angle with a direction showing the smallest linear transmitting light quantity of the anisotropic scattering film than an angle with a direction showing the largest linear transmitting light quantity of the anisotropic scattering film. This relationship is expressed by an inequality, $0° \leq \alpha < \beta$, when the angle formed by the direction showing the smallest linear transmitting light quantity of the anisotropic scattering film and the axial direction of the scattering central axis is taken as $\alpha$ and the angle formed by the direction showing the largest linear transmitting light quantity of the anisotropic scattering film and the axial direction of the scattering central axis is taken as $\beta$. In usual display element, the larger contrast ratio of a direction is, the smaller the angle formed by its direction and the direction showing the largest contrast ratio is, and the smaller contrast ratio of a direction is, the larger the angle formed by its direction and the direction showing the largest contrast ratio is. Therefore, thereby, the operation and effect of the present invention can be attained more effectively because a light in the direction showing the large contrast ratio of the display element is scattered more intensely than the light in the direction showing the small contrast ratio of the display element.

More preferred form of the anisotropic scattering film includes the form (i) in which a pattern of a graph showing the incidence angle dependency of the scattering property is approximately shaped like a letter W in the drawing which shows a relationship between the incidence angle and the linear transmitting light quantity (for example, refer to FIG. 5) and the form (ii) in which a pattern of a graph is approximately shaped like a letter U in the drawing. Hereinafter, the present invention will be described by way of an example of the anisotropic scattering film having the form (i) and having the scattering central axis in the direction of the normal to the film surface.

In the case of the anisotropic scattering film having the form (i) and having the scattering central axis in the direction of the normal to the film surface, the linear transmitting light quantity is adequately small in the axial direction of the scattering central axis (the direction of the normal to the film surface) and decreases gradually as the angle (incidence angle) formed with the axial direction of the scattering central axis Increases, and exhibits a minimum value in a direction in which the incidence angle is 5 to 20° ($\alpha$). And, in the directions in which the incidence angle is larger than $\alpha$, the linear transmitting light quantity increases as the incidence angle increases and the linear transmitting light quantity exhibits a maximum value in a direction in which the incidence angle is 40 to 65° ($\beta$). In the directions in which the incidence angle is larger than $\beta$, the linear transmitting light quantity decreases as the incidence angle increases. Such an incidence angle dependency of a scattering property can be approximately equally obtained in any azimuth, that is, a drawing showing a relationship between the incidence angle and the linear transmitting light quantity is symmetric about the scattering central axis (the axis of an incidence angle of 0°, for example, refer to FIG. 5).

In addition, the axial direction of the scattering central axis and a range of the incidence angle at which the linear transmitting light quantity exhibits a minimum value or a maximum value are just a few examples and is not limited to this. And, in the form (i), the linear transmitting light quantity in the axial direction of the scattering central axis is preferably smaller and the form, in which the linear transmitting light quantity exhibits a minimum value in the axial direction of the scattering central axis, is the above form (ii).

Figure 1B:
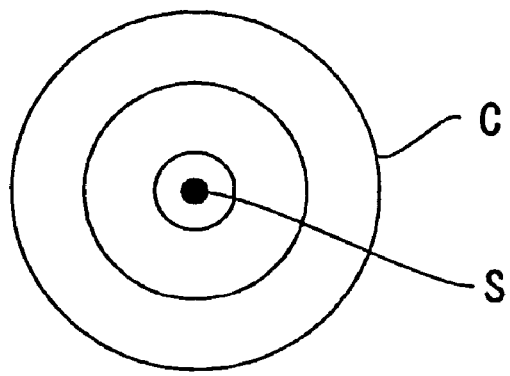
FIG. 1B is a plan schematic diagram in viewing the curved surface in bell form which specifies a linear transmitting light quantity in each direction in FIG. 1A in a front direction.

When the linear transmitting light quantities and the traveling directions of all-directional incident light are expressed by a vector starting at one exiting point and the incidence angle dependency of the scattering property of the anisotropic scattering film having the above form (ii) is expressed by a curved surface formed by the tips of theses vectors, this curved surface of the incidence angle dependency of the scattering property preferably becomes a curved surface in bell form (indicated by a broken line in FIG. 1A), which is symmetric about the scattering central axis as shown in FIGS. 1A and 1B. The anisotropic scattering film exhibits this anisotropic scattering property and thereby the effect of improvement in the viewing angle dependency of contrast ratio can be attained in an especially wide azimuth while especially inhibiting the largest contrast ratio from deteriorating. And, the effect of improvement in the viewing angle dependency of the contrast ratio can be attained equally in a wide azimuth. Further, since the above-mentioned operation and effect can be readily obtained by aligning the direction of the normal to the viewing screen of the display element with the direction of the normal to the film surface of the anisotropic scattering film, that is, by bonding the display element to the anisotropic scattering film.

Further, in the above form (i) or (ii), a range of the incidence angle at which the linear transmitting light quantity is below a prescribed value may becomes wide. Thereby, the operation and effect of the present invention can be attained further effectively because the light in a wide range of directions showing the large contrast ratio of the display element is scattered more intensely than the light in a direction showing the low contrast ratio.

Further, with respect to the anisotropic scattering film, the angle formed by the direction showing the smallest linear transmitting light quantity and the axial direction of the scattering central axis, is preferably close to 0°. And, a minimum value of the linear transmitting light quantity is preferably 50% or less of a maximum value in a drawing (for example, refer to FIG. 5) which shows a relationship between the incidence angle and the linear transmitting light quantity, more preferably 30% or less, and furthermore preferably 20% or less.

The display element is preferably a liquid crystal display element. Thereby, the reductions in profile/weight and power consumption of the display can be realized and the viewing angle dependency of the contrast ratio of the liquid crystal display element can be improved in a wide azimuth.

The liquid crystal display element preferably has
a liquid crystal cell having a liquid crystal sandwiched between a pair of substrates and
a polarizing plate comprising a supporting film and a polarizing element.

The liquid crystal display element having such a form develops the viewing angle dependency of the contrast ratio resulting from at least the anisotropy of the refractive index of the liquid crystal or a polarization absorption property and a polarization transmission property of the polarizing plate. Therefore, by locating the anisotropic scattering film on the viewing screen side of such a liquid crystal display element, the viewing angle dependency of the contrast ratio of the liquid crystal display element can be improved.

In addition, the form of the liquid crystal cell is not particularly limited and includes, for example, a form of having a liquid crystal sandwiched between a thin film transistor array substrate and a color filter substrate. The form of the polarizing plate is not particularly limited and it includes a form of including a polarizing element and a supporting film in this order from a liquid crystal cell side, a form of including a supporting film and a polarizing element in this order from a liquid crystal cell side, and a form of including a first supporting film, a polarizing element and a second supporting film in this order from a liquid crystal cell side. As the supporting film, the same substance as the transparent substrate of the anisotropic scattering film can be used. Further, the polarizing plate is generally located on both of the viewing screen side and the backside of the liquid crystal cell but it may be located on only the viewing screen side or on only the backside. Preferably, the polarizing plate further includes a retardation film. Thereby, the viewing angle dependency of the chromaticity of the liquid crystal display element can also be improved more.

Further, the display mode of the liquid crystal display element is not particularly limited and includes, for example, a vertical alignment (VA) mode, a twisted nematic (TN) mode, an in-plane switching (IPS) mode or an optically compensated birefringence (OCB) mode.

The VA mode is a mode in which the a liquid crystal molecule is aligned in the direction approximately perpendicular to a substrate surface when a voltage is not applied and display is carried out by tilting the liquid crystal molecule down by application of a voltage. The VA mode includes a Multi-domain Vertical Alignment (MVA) mode in which a liquid crystal cell is split into multiple domains by providing a projecting structure and/or a slit on the substrate. In addition, in the VA mode liquid crystal display element, a liquid crystal preferably has negative dielectric constant anisotropy.

The TN mode is a mode in which the longitudinal axes of liquid crystal molecules are aligned approximately in parallel with a substrate surface and in such a manner as to twist sequentially by a prescribed angle (twist angle) between a pair of the substrates when a voltage is not applied and display is carried out by realigning the longitudinal axes in parallel with the direction of an electric field by the application of a voltage. In addition, the TN mode includes not only a normal TN mode in which a twist angle is 90° but also a STN mode in which a twist angle is 180° or more. In addition, in the TN mode liquid crystal display element, a liquid crystal preferably has positive dielectric constant anisotropy.

The IPS mode is a mode in which display is carried out by rotating a liquid crystal in a plane with a substrate surface by a lateral electric field applied between a pair of comb-type electrodes provided on one substrate. When a liquid crystal molecule has negative dielectric constant anisotropy, the longitudinal axis of the liquid crystal molecule is located in the direction approximately perpendicular to the direction of the teeth of a comb-type electrode when a voltage is not applied and rotated in the direction approximately parallel to the direction of the teeth of a comb-type electrode by the application of a voltage. And, when the liquid crystal molecule has positive dielectric constant anisotropy, the longitudinal axis of a liquid crystal molecule is located in the direction approximately parallel with the direction of the teeth of a comb-type electrode when a voltage is not applied and rotated in the direction approximately perpendicular to the direction of the teeth of a comb-type electrode by the application of a voltage. Further, when a voltage is not applied, the longitudinal axis of a liquid crystal molecule is located approximately in parallel with a substrate surface and a polarization axis of one polarizing element irrespective of a plus or a minus sign of dielectric constant anisotropy of the liquid crystal molecule.

The OCB mode is a mode of performing a three-dimensional optical compensation by providing an alignment structure which is optically complementary in the direction of liquid crystal thickness (bend alignment) and using a retardation film.

Incidentally, in the case that the display mode of the display element is the VA mode, TN mode or OCB mode, the anisotropic scattering film is preferably located in such a way that the axial direction of its scattering central axis is parallel to the longitudinal axial direction of the liquid crystal molecule positioned near the center of the thickness direction of the liquid crystal layer at the time of displaying black. And, in the case that the display mode of the display element is the IPS mode, the anisotropic scattering film is preferably located in such a way that the axial direction of its scattering central axis is perpendicular to the longitudinal axial direction of the liquid crystal molecule positioned near the center of the thickness direction of the liquid crystal layer at the time of displaying black. In accordance to these forms, the anisotropic scattering film is located in such a way that the axial direction of its scattering central axis is parallel to the direction showing the lowest contrast ratio of the liquid crystal display element at the time of displaying black, and light scattered in the direction showing large black luminance is reduced. As the result, the deterioration of the largest contrast ratio can be kept to a minimum.

In accordance with the display of the present invention, it is possible to improve viewing angle dependency of contrast ratio in a wide azimuth without changing design of a basic structure of a display element, impairing display quality in a direction showing large contrast ratio and being limited to a state of displaying white or black.

Hereinafter, the present invention will be described in more detail by way of embodiments, but the present invention is not limited to these embodiments.

1. Preparation of Liquid Crystal Display

Embodiment 1

(Preparation of First Anisotropic Scattering Film)

First, a liquid resin was discharged onto a marginal area of a polyethylene terephthalate (PET) film having a thickness of 75 μm and a size of 76 mm×26 mm (Product name: COSMOSHINE (R) A4300, produced by TOYOBO Co., Ltd.) using a dispenser and then it was cured to form an isolating wall with a height of 0.2 mm. Next, a photopolymerizable composition of the following composition was added dropwise in a region surrounded the isolating wall and then it was covered with another PET film.

<<Composition of a Photopolymerizable Composition>>

| 2-(perfluorooctyl)ethylacrylate | 50 parts by weight |
|---|---|
| 1,9-nonanediol diacrylate | 50 parts by weight |
| 2-hydroxy-2-methyl-1-phenylpropane-1-one | 4 parts by weight |

Next, ultraviolet light was irradiated to the liquid film having thickness of 0.2 mm and being sandwiched on both sides between PET films, for 1 minute at the irradiation intensity of 30 mW/cm² vertically from an epi-illumination unit of a UV spot light source (Product name: L2859-01, manufactured by Hamamatsu Photonics K.K.) to obtain a first anisotropic scattering film having many minute rod-shaped regions as shown in FIG. 2A.

(Measurement of Scattering Property of First Anisotropic Scattering Film)

Figure 4:
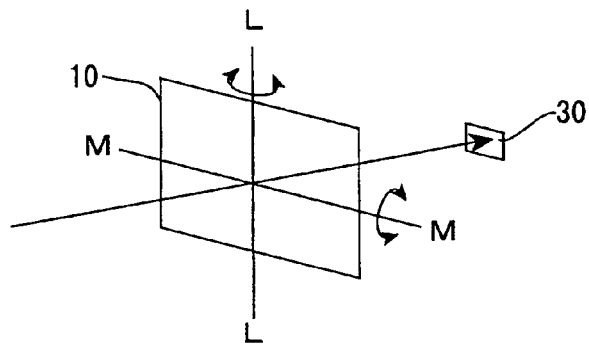
FIG. 4 is a perspective schematic diagram showing a method of measuring a scattering property of a scattering film.

FIG. 4 is a perspective schematic diagram showing a method of measuring the anisotropic scattering property of the first anisotropic scattering film.

In accordance with the method shown in FIG. 4, not only the linear transmitting light quantity in the case where an optical axis is coincident with the direction of the normal to a test surface (the incidence angle is 0°) but also the linear transmitting light quantity in the case where the optical axis is not coincident with the direction of the normal to a test surface (the incidence angle is not 0°) can be measured by rotating a specimen about a prescribed direction as a rotation axis. Specifically, first, using a goniophotometer (Product name: GoniophotoMeter GP-5, manufactured by Murakami Color Research Laboratory Co., Ltd.), an optical receiver 30 was secured at a position to receive light traveling in straight from a light source (not shown) and the first anisotropic scattering film 10a was attached to a sample holder (not shown) between the light source and the optical receiver 30 as shown in FIG. 4. Next, as shown in FIG. 4, the sample was rotated to various angles about the direction of the short side of the film sample as a rotation axis (L) (hereinafter, also referred to as a rotation about the short side axis) and the linear transmitting light quantity corresponding to each incidence angle was measured. Next, the sample was rotated to various angles about the direction of the long side of the film sample as a rotation axis (M) (hereinafter, also referred to as a rotation about the long side axis) and the linear transmitting light quantity corresponding to each incidence angle was measured.

Figure 5A:
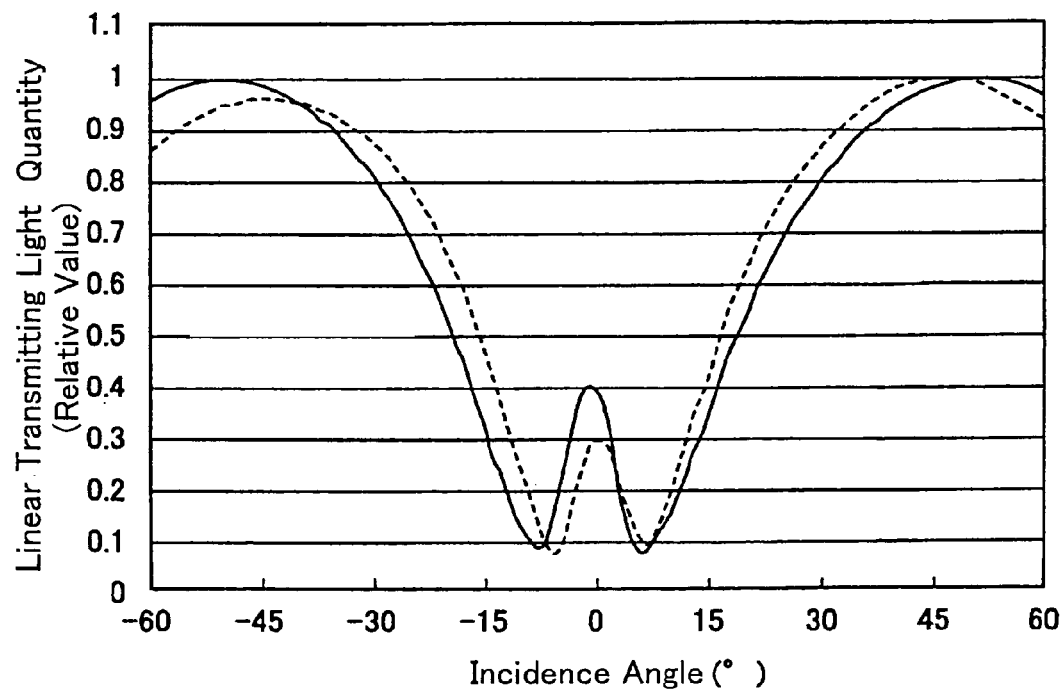
FIG. 5A is a view showing a relationship between an incidence angle and a linear transmitting light quantity when the first anisotropic scattering film is rotated about two mutually-perpendicular rotation axes respectively.

FIG. 5A is a view showing a relationship between the incidence angle and the linear transmitting light quantity when the first anisotropic scattering film is rotated about the above-mentioned two rotation axes. In addition, a solid line in the drawing represents the case of performing the rotation about the short side axis and a broken line represents the case of performing the rotation about the long side axis. In addition, the plus and minus signs of the incidence angle represent the directions of rotation.

From FIG. 5A, it was found that in both of the case of performing a rotation about the short side axis and the case of performing the rotation about the long side axis, the scattering property of the first anisotropic scattering film has the form of a deep valley including a small peak at the incidence angle of 0° and is approximately symmetric. In addition, it was found that the first anisotropic scattering film exhibits about the same scattering properties in the case of performing the rotation about the short side axis and the case of performing the rotation about the long side axis. In addition, it was found from these results that the first anisotropic scattering film has the scattering central axis in the direction of the normal to the film surface. Further, a rate of change in the linear transmitting light quantity was 0.90 in both of the case of performing the rotation about the short side axis and the case of performing the rotation about the long side axis.

(Preparation of Liquid Crystal Display)

Figure 6:
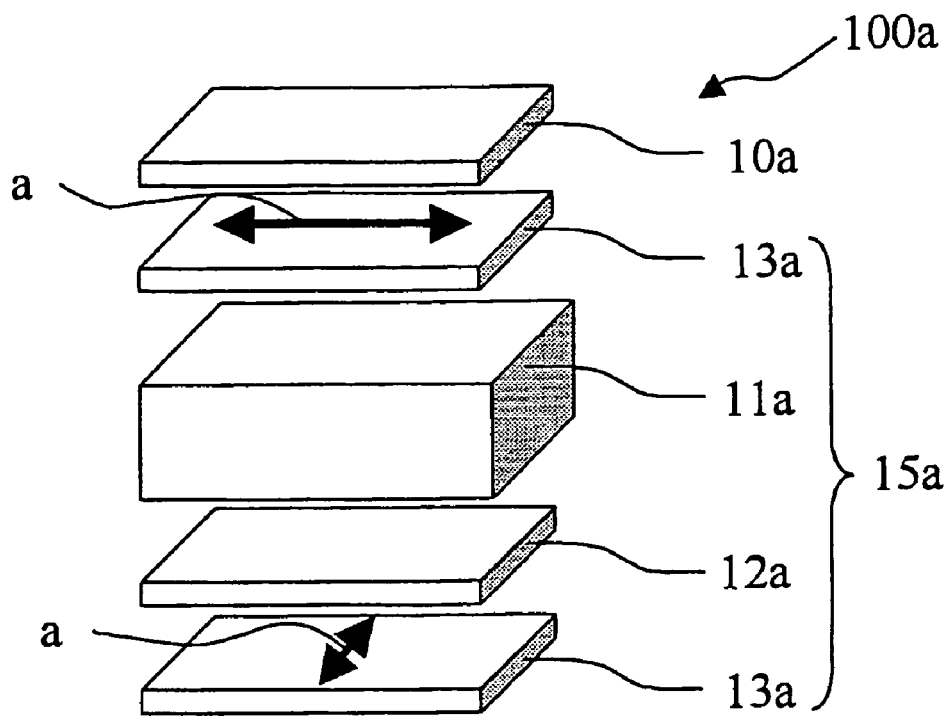
FIG. 6 is a perspective schematic diagram showing a constitution of a VA mode liquid crystal display concerning Embodiment 1 of the present invention.

FIG. 6 is a perspective schematic diagram showing a constitution of a VA mode liquid crystal display 100a concerning Embodiment 1 of the present invention. Further, a relative positional relationship between the respective films and between the directions of axes of the respective films is as is shown in FIG. 6.

First, a relationship between the birefringence Δn of a liquid crystal material and the thickness d of a liquid crystal cell was adjusted to Δn·d=300 nm and a VA mode liquid crystal cell 11a in which a tilt direction of a liquid crystal molecule was split into four azimuths having azimuth angles of 45, 135, 225 and 315° in applying an voltage was prototyped. Next, a first retardation film 12a was bonded to a backlight side of the VA mode liquid crystal cell 11a, and further a first polarizing plate 13a, in which a supporting film on the VA mode liquid crystal cell 11a side was TAC (triacetylcellulose) film, was bonded to a backlight side of the first retardation film 12a and a viewing screen side of the VA mode liquid crystal cell 11a, respectively, to prepare a VA mode liquid crystal display element 15a. Next, the first anisotropic scattering film 10a was bonded to a viewing screen side of the VA mode liquid crystal display element 15a to prepare a VA mode liquid crystal display 100a.

In addition, the direction of the normal to the film surface of the first anisotropic scattering film 10a is coincident with the direction of the normal to the viewing screen of the VA mode liquid crystal display element 15a. And, with respect to the retardation of the first retardation film 12a, Re is 3 nm and Rth is 250 nm. When two principal refractive indexes in a plane of three principal refractive indexes of an index ellipsoid are taken as nx, ny (nx≧ny) and one principal refractive index in a normal direction is taken as nz and a thickness of the retardation film is taken as d, the above-mentioned Re is expressed by the following equation (1):

$$Re=(nx-ny) \times d \quad (1)$$

In addition, using the above-mentioned nx, nz and d, Rth is expressed by the following equation (2):

$$Rth=(nx-nz) \times d \quad (2)$$

Re and Rth are determined by the same method in the following embodiments and comparative examples.

In addition, with respect to the performance of a polarizing element constituting the first polarizing plate 13a, parallel transmittance was 36.25%, cross transmittance was 0.005% and a polarization degree was 99.99%.

Embodiment 2

Figure 7:
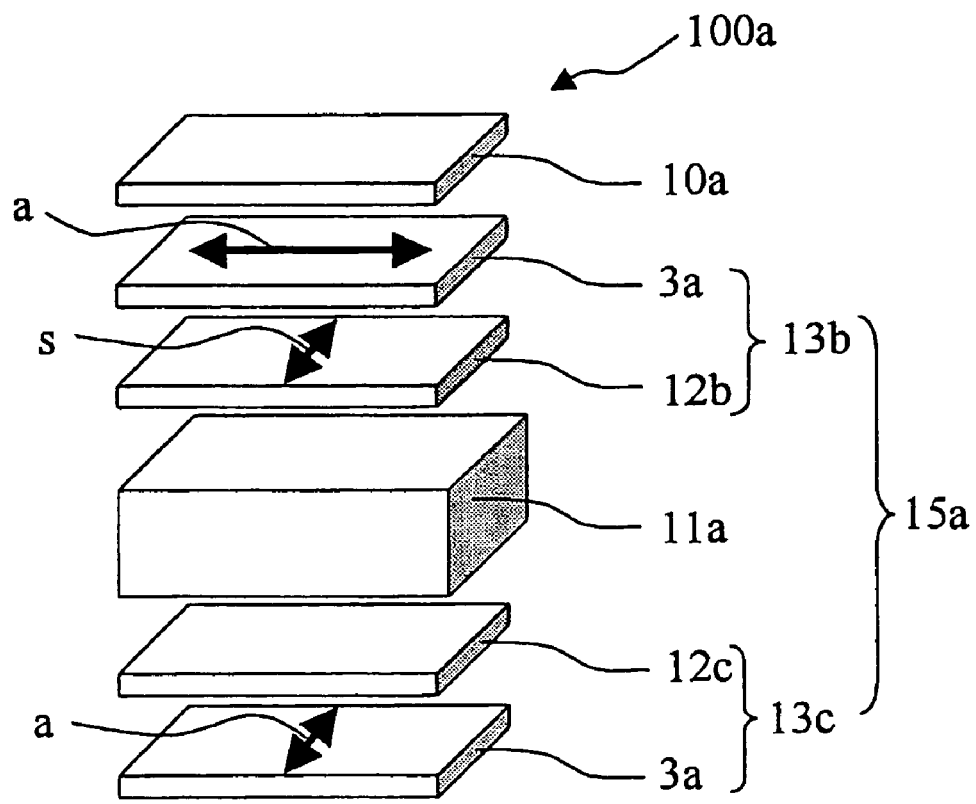
FIG. 7 is a perspective schematic diagram showing a constitution of a VA mode liquid crystal display concerning Embodiment 2 of the present invention.

FIG. 7 is a perspective schematic diagram showing a constitution of a VA mode liquid crystal display 100a concerning Embodiment 2 of the present invention. Further, a relative positional relationship between the respective films and between the directions of axes of the respective films is as is shown in FIG. 7.

First, a second polarizing plate 13b, in which a supporting film on the VA mode liquid crystal cell 11a side was a second retardation film 12b, was bonded to a viewing screen side of the VA mode liquid crystal cell 11a prototyped in Embodiment 1 and a third polarizing plate 13c, in which a supporting film on the VA mode liquid crystal cell 11a side was a third retardation film 12c, was bonded to a backlight side of the VA mode liquid crystal cell 11a to prepare a VA mode liquid crystal display element 15a. Next, the first anisotropic scattering film 10a similar to that in Embodiment 1 was bonded to a viewing screen side of the VA mode liquid crystal display element 15a to prepare a VA mode liquid crystal display 100a.

In addition, the direction of the normal to the film surface of the first anisotropic scattering film 10a is coincident with the direction of the normal to the viewing screen of the VA mode liquid crystal display element 15a. In addition, with respect to the retardation of the second retardation film 12b, Re is 140 nm and Rth is 138 nm, and with respect to the retardation of the third retardation film 12c, Re is 2 nm and Rth is 190 nm. In addition, the performance of a polarizing element 3a is the same as that of Embodiment 1.

Embodiment 3

Figure 8:
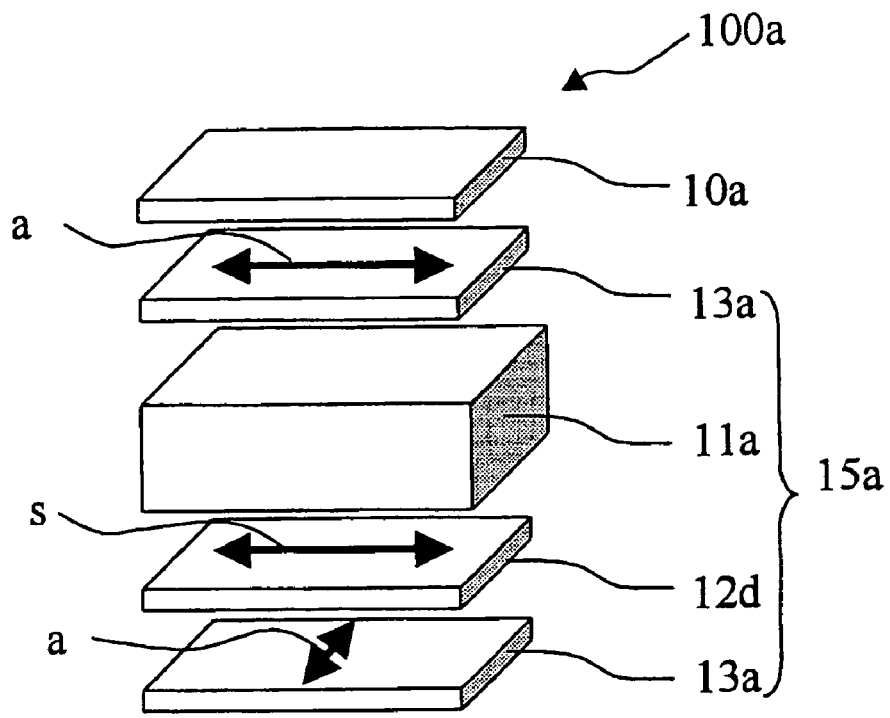
FIG. 8 is a perspective schematic diagram showing a constitution of a VA mode liquid crystal display concerning Embodiment 3 of the present invention.

FIG. 8 is a perspective schematic diagram showing a constitution of a VA mode liquid crystal display 100 concerning Embodiment 3 of the present invention. Further, a relative positional relationship between the respective films and between the directions of axes of the respective films is as is shown in FIG. 8.

First, a fourth retardation film 12d was bonded to a backlight side of the VA mode liquid crystal cell 11a prototyped in Embodiment 1, and further a first polarizing plate 13a, in which a protective film on the VA mode liquid crystal cell 11a side was TAC (triacetylcellulose) film, was bonded to a backlight side of the fourth retardation film 12d and a viewing screen side of the VA mode liquid crystal cell 11a, respectively, to prepare a VA mode liquid crystal display element 15a. Next, the first anisotropic scattering film 10a similar to Embodiment 1 was bonded to a viewing screen side of the VA mode liquid crystal display element 15a to prepare a VA mode liquid crystal display 100a.

In addition, the direction of the normal to the film surface of the first anisotropic scattering film 10a is coincident with the direction of the normal to the viewing screen of the VA mode liquid crystal display element 15a. In addition, with respect to the retardation of the fourth retardation film 12d, Re is 50 nm and Rth is 220 nm. In addition, the performance of the first polarizing plate 13a is the same as that of Embodiment 1.

Embodiment 4

The constitution of the liquid crystal display concerning Embodiment 4 is the same as that of Embodiment 3 except using the following second anisotropic scattering film instead of the first anisotropic scattering film.

(Preparation of Second Anisotropic Scattering Film)

This producing method is the same as that of the first anisotropic scattering film except that ultraviolet light is irradiated to a liquid film at an inclination of 15° from a vertical direction. Thereby, a second anisotropic scattering film was obtained. In addition, when the cross section of the second anisotropic scattering film (anisotropic scattering layer) was observed with a microscope, many minute rod-shaped regions 20 extending at an inclination of 15° from the direction of the normal to the film surface were recognized as shown in FIG. 2B.

(Measurement of Scattering Property of Second Anisotropic Scattering Film)

Figure 5B:
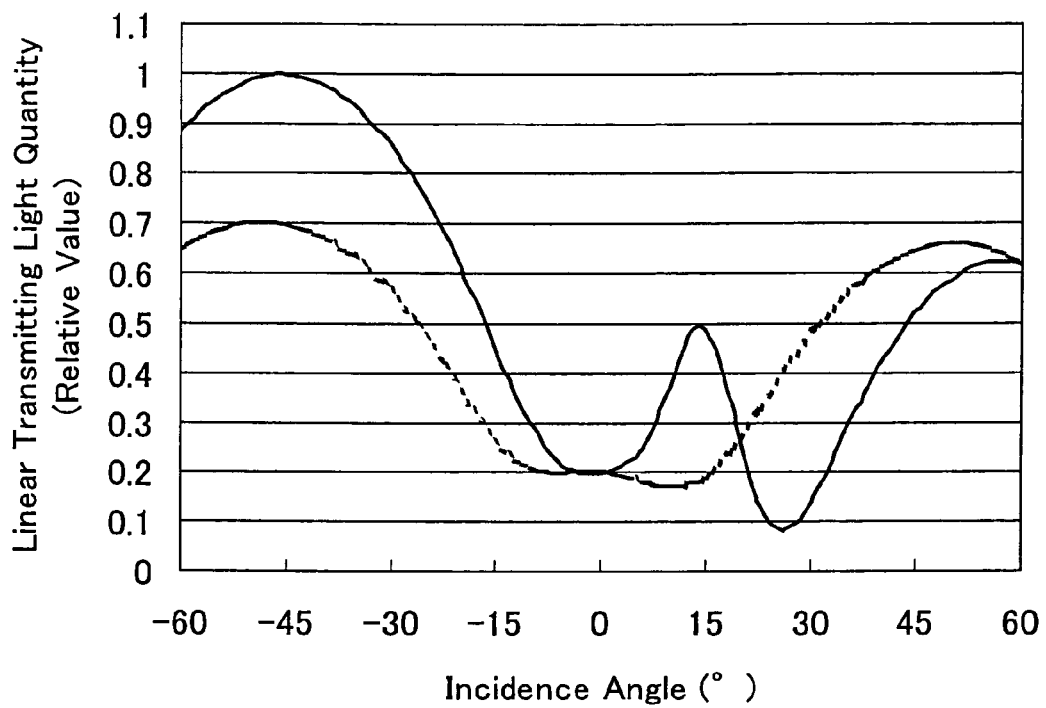
FIG. 5B is a view showing a relationship between an incidence angle and a linear transmitting light quantity when a second anisotropic scattering film is rotated about two mutually-perpendicular rotation axes respectively.

FIG. 5B is a view showing a relationship between the incidence angle and the linear transmitting light quantity when the second anisotropic scattering film is rotated about the above-mentioned two rotation axes. In addition, a solid line in the drawing represents the case of performing the rotation about the short side axis (the case of performing the rotation about the azimuth perpendicular to the extending azimuth of the rod-shaped regions 20). A broken line in the drawing represents the case of performing the rotation about the long side axis (the case of performing the rotation about the azimuth parallel to the extending azimuth of the rod-shaped regions 20). In addition, the plus and minus signs of the incidence angle represent the directions of rotation.

By measuring the scattering prioperty of the second anisotropic scattering film as well as that of the first anisotropic scattering film, it was found that in the extending azimuth of the rod-shaped regions 20, the scattering property of the second anisotropic scattering film has the form of a deep valley including a small peak at the incidence angle of 15°. And, it was found that in the azimuth perpendicular to the extending azimuth of the rod-shaped regions 20, the scattering property of the second anisotropic scattering film has the form of a deep valley which has the deepest portion at the incidence angle of 0°. Therefore, it is found that the second anisotropic scattering film has a scattering central axis in the direction coincident with the extending direction of the rod-shaped regions 20 and the scattering central axis is at an inclination of 15° from the direction of the normal to the film surface.

(Preparation of Liquid Crystal Display)

Figure 9:
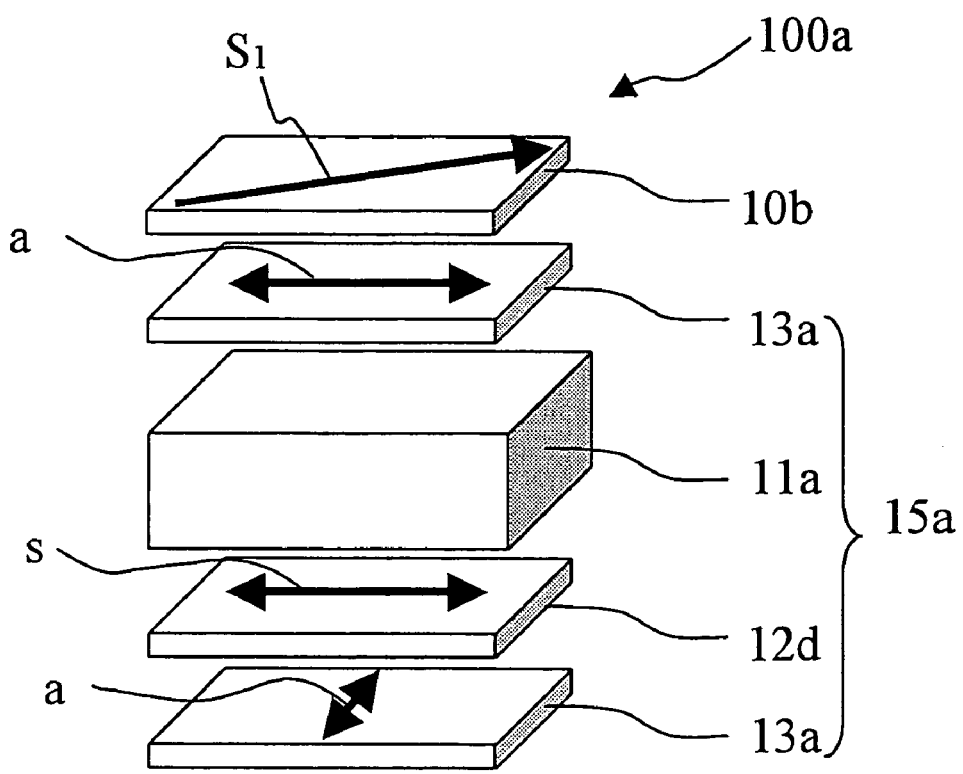
FIG. 9 is a perspective schematic diagram showing a constitution of a VA mode liquid crystal display concerning Embodiment 4 of the present invention.

FIG. 9 is a perspective schematic diagram showing a constitution of a VA mode liquid crystal display 10a concerning Embodiment 4 of the present invention. Further, a relative positional relationship between the respective films and between the directions of axes of the respective films is as is shown in FIG. 9.

The constitution of the liquid crystal display is the same as that of Embodiment 3 except for using second anisotropic scattering film 10b instead of the first anisotropic scattering film 10a. In addition, the axial azimuth of the scattering central axis of the second anisotropic scattering film 10b is coincident with the azimuth having an azimuth angle of 45° from backlight side to viewing screen side.

Embodiment 5

The constitution of the liquid crystal display concerning Embodiment 5 is the same as that of Embodiment 3 except using the following third anisotropic scattering film instead of the first anisotropic scattering film.

(Preparation of Third Anisotropic Scattering Film)

This producing method is the same as that of the first anisotropic scattering film except that ultraviolet light is irradiated to the liquid film at an inclination of 30° from a vertical direction. Thereby, a third anisotropic scattering film was obtained. In addition, when the cross section of the third anisotropic scattering film (anisotropic scattering layer) was observed with a microscope, many minute rod-shaped regions 20 extending at an inclination of 30° from the direction of the normal to the film surface were recognized as shown in FIG. 2C.

(Measurement of Scattering Property of Third Anisotropic Scattering Film)

Figure 5C:
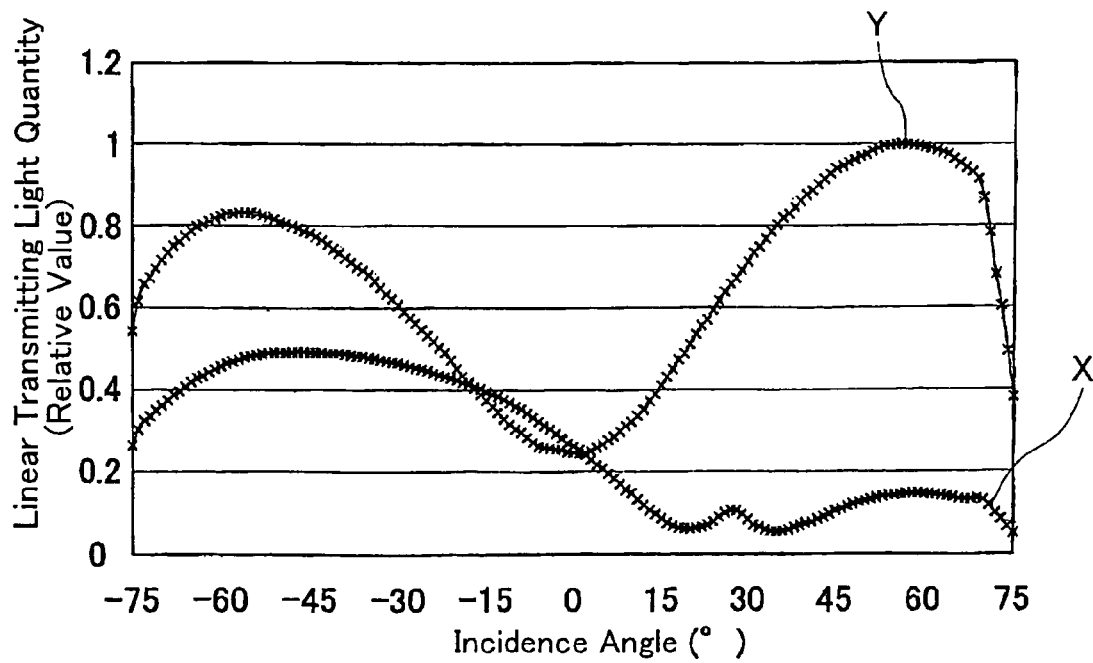
FIG. 5C is a view showing a relationship between an incidence angle and a linear transmitting light quantity when a third anisotropic scattering film is rotated about two mutually-perpendicular rotation axes respectively, wherein X represents the above relationship in a length azimuth of rod-shaped cured regions (an axial azimuth of a scattering central axis) and Y represents the above relationship in an azimuth perpendicular to the length azimuth of the rod-shaped cured regions.

FIG. 5C is a view showing a relationship between the incidence angle and the linear transmitting light quantity when a third anisotropic scattering film is rotated about the two rotation axes parallel and perpendicular to the extending azimuth of the rod-shaped regions 20 respectively.

By measuring the scattering prioperty of the third anisotropic scattering film as well as that of the first anisotropic scattering film, it was found that in the extending azimuth of the rod-shaped regions 20, the scattering property of the third anisotropic scattering film has the form of a deep valley including a small peak at the incidence angle of 30°. And, it was found that in the azimuth perpendicular to the extending azimuth of the rod-shaped regions 20, the scattering property of the third anisotropic scattering film has the form of a deep valley which has the deepest portion at the incidence angle of 0°. Therefore, it is found that the third anisotropic scattering film has a scattering central axis in the direction coincident with the extending direction of the rod-shaped regions 20 and the scattering central axis is at an inclination of 30° from the direction of the normal to the film surface.

(Preparation of Liquid Crystal Display)

Figure 10:
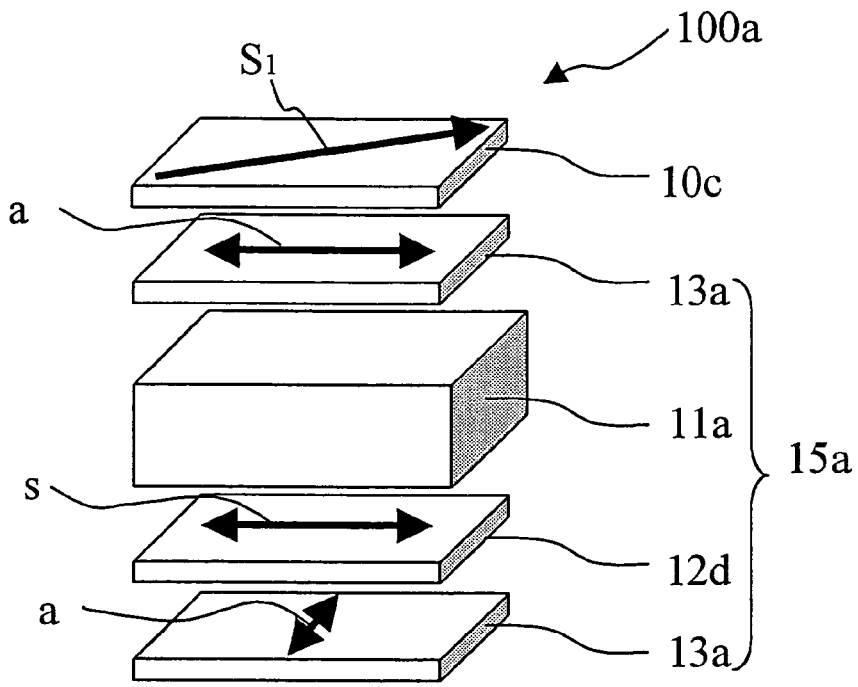
FIG. 10 is a perspective schematic diagram showing a constitution of a VA mode liquid crystal display concerning Embodiment 5 of the present invention.

FIG. 10 is a perspective schematic diagram showing a constitution of a VA mode liquid crystal display 100a concerning Embodiment 5 of the present invention. Further, a relative positional relationship between the respective films and between the directions of axes of the respective films is as is shown in FIG. 10.

The constitution of the liquid crystal display is the same as that of Embodiment 3 except for using third anisotropic scattering film 10c instead of the first anisotropic scattering film 10a. In addition, the axial azimuth of the scattering central axis of the third anisotropic scattering film 10c is coincident with the azimuth having an azimuth angle of 45° from backlight side to viewing screen side.

Embodiment 6

Figure 11:
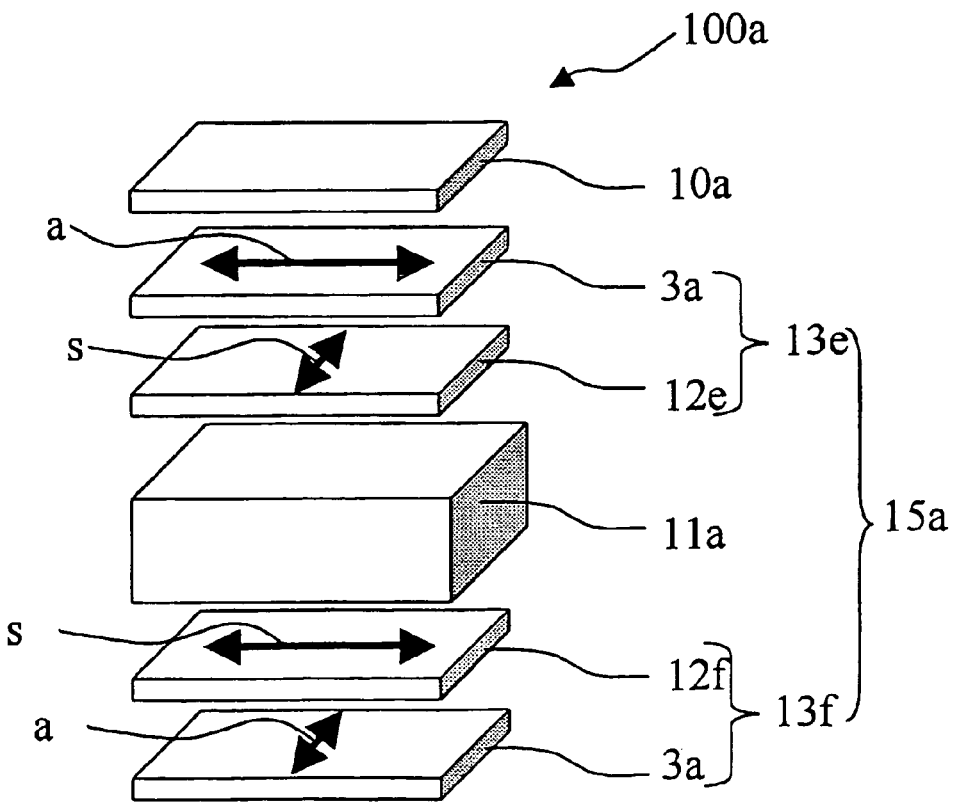
FIG. 11 is a perspective schematic diagram showing a constitution of a VA mode liquid crystal display concerning Embodiment 6 of the present invention.

FIG. 11 is a perspective schematic diagram showing a constitution of a VA mode liquid crystal display 100a concerning Embodiment 6 of the present invention. Further, a relative positional relationship between the respective films and between the directions of axes of the respective films is as is shown in FIG. 11.

First, a fifth polarizing plate 13e, in which a supporting film on the VA mode liquid crystal cell 11a side was a fifth retardation film 12e, was bonded to a viewing screen side of the VA mode liquid crystal cell 11a prototyped in Embodiment 1 and a sixth polarizing plate 13f, in which a supporting film on the VA mode liquid crystal cell 11a side was a sixth retardation film 12f, was bonded to a backlight side of the VA mode liquid crystal cell 11a to prepare a VA mode liquid crystal display element 15a. Next, the first anisotropic scattering film 10a similar to that in Embodiment 1 was bonded to a viewing screen side of the VA mode liquid crystal display element 15a to prepare a VA mode liquid crystal display 100a.

In addition, the direction of the normal to the film surface of the first anisotropic scattering film 10a is coincident with the direction of the normal to the viewing screen of the VA mode liquid crystal display element 15a. In addition, with respect to both of the retardation of the fifth and the sixth retardation film 12e and 12f, each Re is 60 nm and each Rth is 90 nm. In addition, the performance of a polarizing element 3a is the same as that of Embodiment 1.

Embodiment 7

Figure 12:
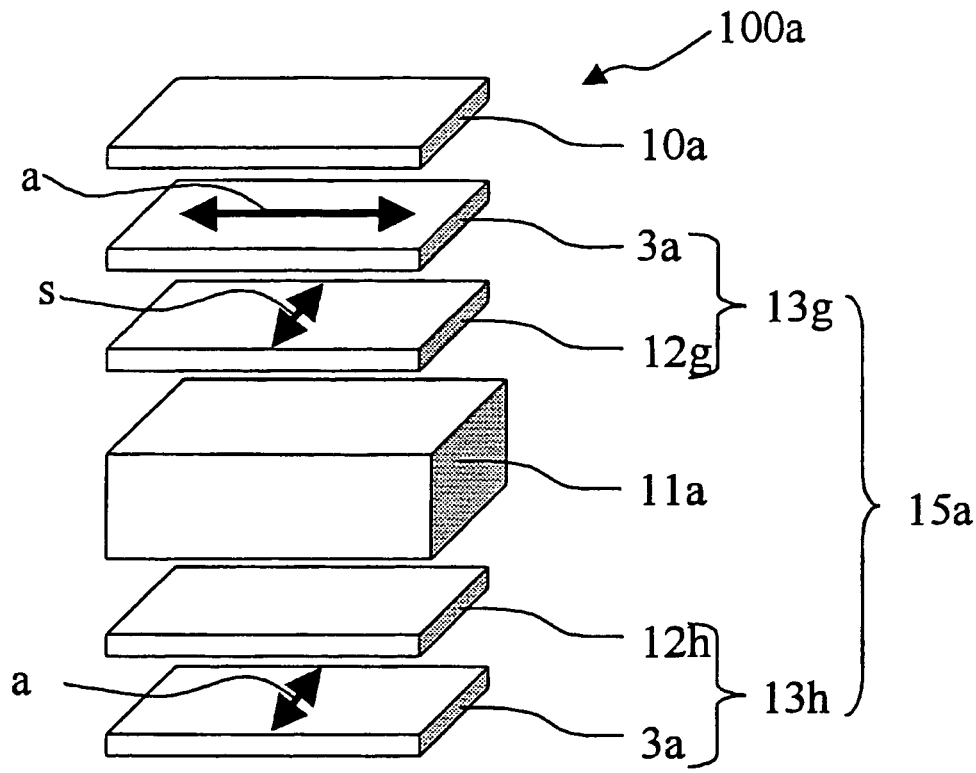
FIG. 12 is a perspective schematic diagram showing a constitution of a VA mode liquid crystal display concerning Embodiment 7 of the present invention.

FIG. 12 is a perspective schematic diagram showing a constitution of a VA mode liquid crystal display 100a concerning Embodiment 7 of the present invention. Further, a relative positional relationship between the respective films and between the directions of axes of the respective films is as is shown in FIG. 12.

First, a seventh polarizing plate 13g, in which a supporting film on the VA mode liquid crystal cell 11a side was a seventh retardation film 12g, was bonded to a viewing screen side of the VA mode liquid crystal cell 11a prototyped in Embodiment 1 and an eighth polarizing plate 13h, in which a supporting film on the VA mode liquid crystal cell 11a side was a eighth retardation film 12h, was bonded to a backlight side of the VA mode liquid crystal cell 11a to prepare a VA mode liquid crystal display element 15a. Next, the first anisotropic scattering film 10a similar to that in Embodiment 1 was bonded to a viewing screen side of the VA mode liquid crystal display element 15a to prepare a VA mode liquid crystal display 100a.

In addition, the direction of the normal to the film surface of the first anisotropic scattering film 10a is coincident with the direction of the normal to the viewing screen of the VA mode liquid crystal display element 15a. In addition, with respect to the retardation of the seventh retardation film 12g, Re is 90 nm and Rth is 100 nm, and with respect to the retardation of the eighth retardation film 12h, Re is 3 nm and Rth is 100 nm. In addition, the performance of a polarizing element 3a is the same as that of Embodiment 1.

Embodiment 8

Figure 13:
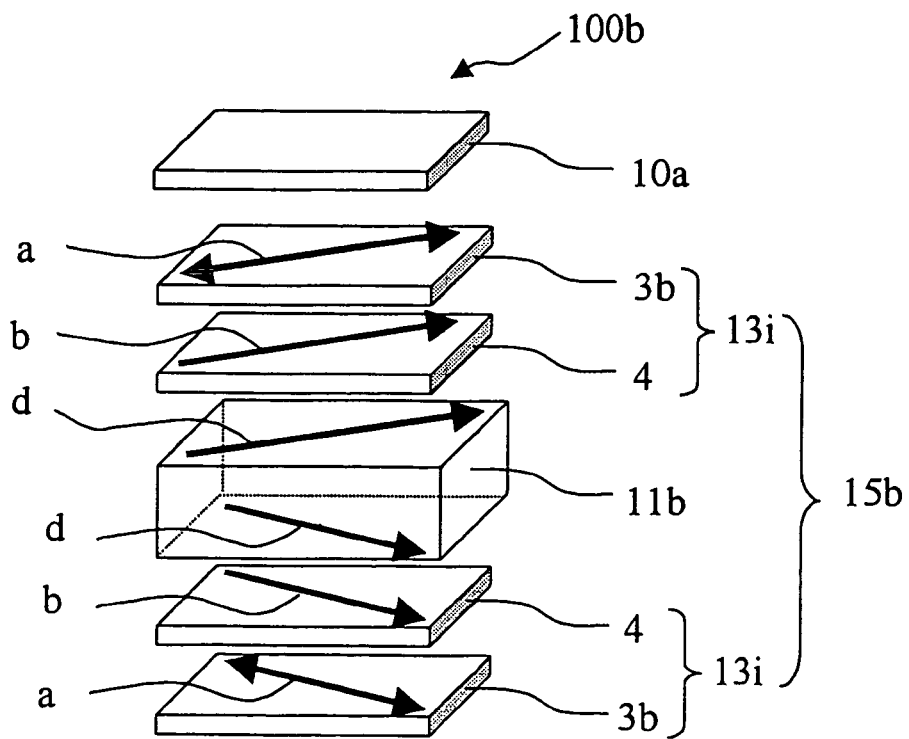
FIG. 13 is a perspective schematic diagram showing a constitution of a TN mode liquid crystal display concerning Embodiment 8 of the present invention.

FIG. 13 is a perspective schematic diagram showing a constitution of a TN mode liquid crystal display 100b concerning Embodiment 8 of the present invention. Further, a relative positional relationship between the respective films and between the directions of axes of the respective films is as is shown in FIG. 13.

First, a TN mode liquid crystal cell 11b, in which a relationship between the birefringence Δn of a liquid crystal material and the thickness d of a liquid crystal cell was adjusted to Δn·d=350 nm, was prototyped and a polarizing plate with a Wide View (WV) film 4 (Product name: Polarizing Plate with viewing angle compensation film NWF-KD•EG, produced by NITTO DENKO CORPORATION) 13i was bonded to the both outsides of the TN mode liquid crystal cell 11b, respectively, to prepare a TN mode liquid crystal display element 15b. Next, a first anisotropic scattering film 10a similar to that in Embodiment 1 was bonded to a viewing screen side of the TN mode liquid crystal display element 15b to prepare a TN mode liquid crystal display 100b.

In addition, the direction of the normal to the film surface of the first anisotropic scattering film 10a is coincident with the direction of the normal to the viewing screen of the TN mode liquid crystal display element 15b. In addition, with respect to the performance of the polarizing plate 13i, parallel transmittance was 36.10%, cross transmittance was 0.005% and a polarization degree was 99.99%.

Embodiment 9

Figure 14:
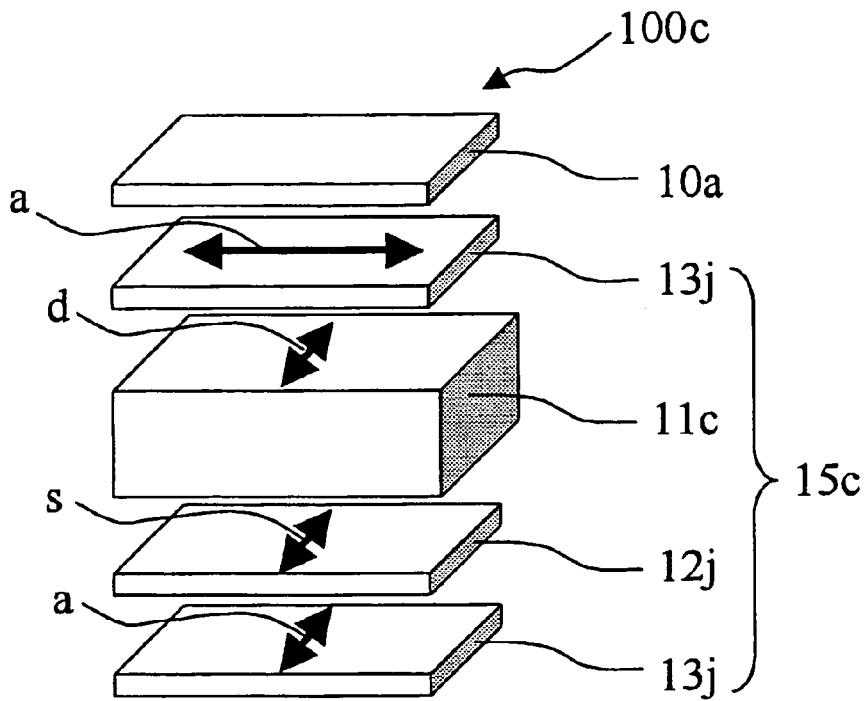
FIG. 14 is a perspective schematic diagram showing a constitution of an IPS mode liquid crystal display concerning Embodiment 9 of the present invention.

FIG. 14 is a perspective schematic diagram showing a constitution of an IPS mode liquid crystal display 100c concerning Embodiment 9 of the present invention. Further, a relative positional relationship between the respective films and between the directions of axes of the respective films is as is shown in FIG. 14.

First, polarizing plates bonded to a viewing screen side and a backlight side of a commercially available IPS mode liquid crystal TV (Product name; TH 26 LX50, manufactured by Matsushita Electric Industrial Co., Ltd.) were peeled off to prepare for an IPS mode liquid crystal cell 11c. Next, a ninth retardation film 12j was bonded to a backlight side of the IPS mode liquid crystal cell 11c, and further a ninth polarizing plate 13i was bonded to a backlight side of the ninth retardation film 12j and a viewing screen side of the IPS mode liquid crystal cell 11c, respectively, to prepare an IPS mode liquid crystal display element 15c. Next, the first anisotropic scattering film 10a similar to that in Embodiment 1 was bonded to a viewing screen side of the IPS mode liquid crystal display element 15c to prepare an IPS mode liquid crystal display 100c.

In addition, the direction of the normal to the film surface of the first anisotropic scattering film 10a is coincident with the direction of the normal to the viewing screen of the IPS mode liquid crystal display element 15c. In addition, with respect to the retardation of the ninth retardation film 12j, Re is 140 nm and Rth is 45 nm. Further, with respect to the performance of the ninth polarizing plate 13i, parallel transmittance was 35.95%, cross transmittance was 0.004% and a polarization degree was 99.99%.

Embodiment 10

A part of a polarizing plate on a backlight side of a commercially available OCB mode liquid crystal TV (Product name: VT 23XD1, manufactured by EIZO NANAO CORPORATION) was peeled off and this peeled portion was bonded to a viewing screen side of the OCB mode liquid crystal TV to prepare an OCB mode liquid crystal display element. Further, to the surface on the viewing screen side of this liquid crystal display element, the first anisotropic scattering film 10a was bonded to prepare an OCB mode liquid crystal display.

In addition, the direction of the normal to the film surface of the first anisotropic scattering film 10a is coincident with the direction of the normal to the viewing screen of the OCB mode liquid crystal display element. In addition, with respect to the performance of the polarizing plate partially peeled, parallel transmittance was 36.30%, cross transmittance was 0.005% and a polarization degree was 99.99%.

Comparative Example 1

(Preparation of Isotropic Scattering Film)
A UV coating material according to the following formulation was applied onto the one side of a PET film having thickness of 75 μm (Product name: COSMOSHINE (R) A4300, produced by TOYOBO Co., Ltd.) with a wire bar. Next, the PET film coated with the UV coating material was dried and irradiated (cured) with UV rays to obtain an isotropic scattering film having a coated layer having a film thickness of about 3 μm.

<<UV Coating Material>>

| | |
|---|---|
| UV curable resin (Product name: BEAM SET (R) 575CB, non-volatile content 100%, produced by Arakawa Chemical Industries, Ltd.) | 98 parts by weight |
| Polystyrene fine particles (Product name: SX 350H, Average particle diameter: 3.5 μm, produced by Soken Chemical & Engineering Co., Ltd.) | 12 parts by weight |
| MIBK (methyl isobutyl ketone) | 100 parts by weight |

Figure 15:
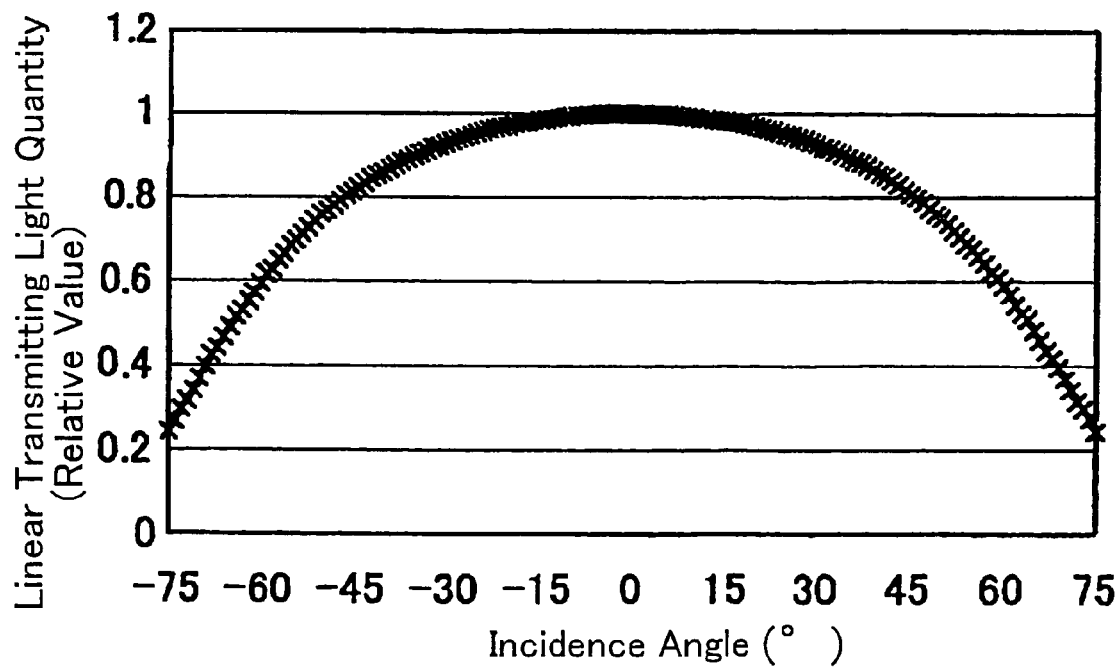
FIG. 15 is a view showing a relationship between an incidence angle and a linear transmitting light quantity when an isotropic scattering film is rotated about two mutually perpendicular rotation axes respectively.

(Measurement of Scattering Property of Isotropic Scattering Film)
A method of measuring the scattering property of an isotropic scattering film is similar to that of the first anisotropic scattering film. The scattering property of the isotropic scattering film is shown in FIG. 15. In the case of the isotropic scattering film, as shown in FIG. 15, a pattern of a graph representing the incidence angle dependency of the scattering property becomes convex upward about the position of incidence angle 0°. The reason for this is that the length of a path along which incident light passes through the film increases with increases in the incidence angle.

Incidentally, the plus and minus signs of the incidence angle represent the directions of rotation.

(Preparation of Liquid Crystal Display)
An isotropic scattering film, in which the turbidity measured with a turbidity meter (Product name: NDH-2000, manufactured by Nippon Denshoku Industries Co., Ltd.) was 30%, was bonded to a viewing screen side of the VA mode liquid crystal display element 15a prototyped in Embodiment 1 to prepare a VA mode liquid crystal display. In addition, the constitution of the liquid crystal display is the same as that of Embodiment 1 except for using the isotropic scattering film instead of the first anisotropic scattering film.

Comparative Example 2

(Preparation of Liquid Crystal Display)
A visible range control film (Product name: LUMISTY (R), Product number: MFX-2020, produced by Sumitomo Chemical Co., Ltd.) was bonded to a viewing screen side of the VA mode liquid crystal display element 15a prototyped in Embodiment 3 to prepare a VA mode liquid crystal display. In addition, the constitution of the liquid crystal display is the same as that of Embodiment. 3 except for using Lumisty (R) instead of the first anisotropic scattering film.

Comparative Example 3

Figure 30:
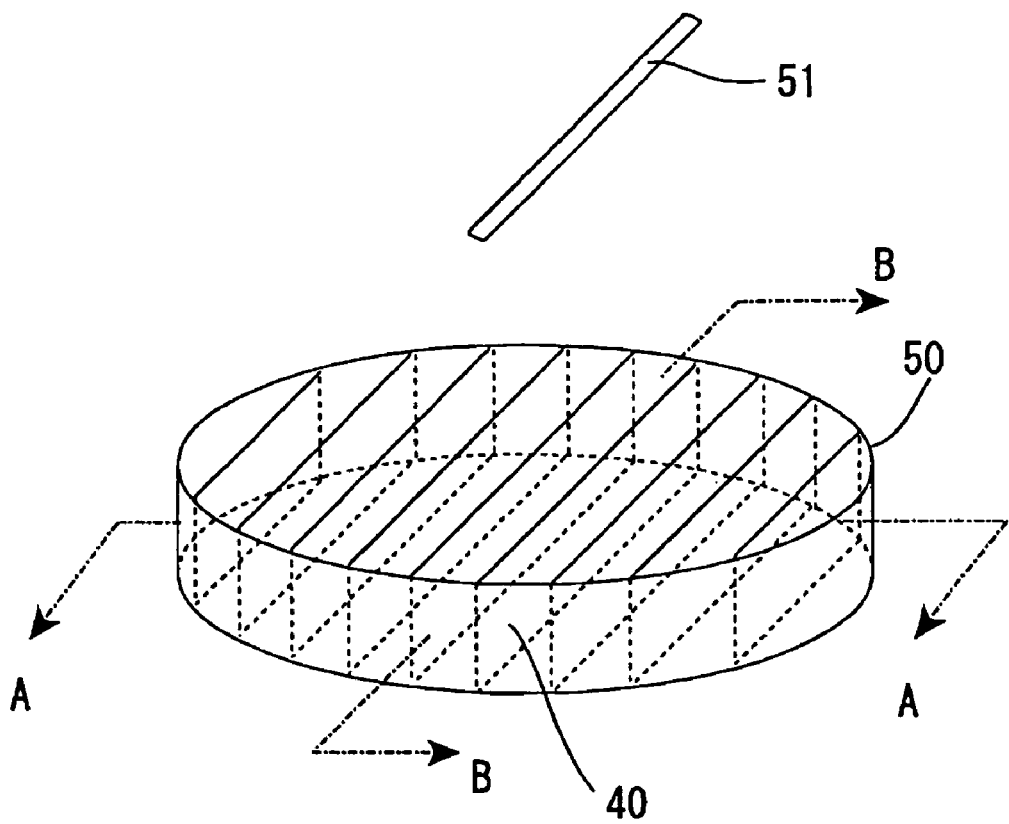
FIG. 30 is a perspective schematic diagram showing a structure of a previous anisotropic scattering film.
Figure 31:
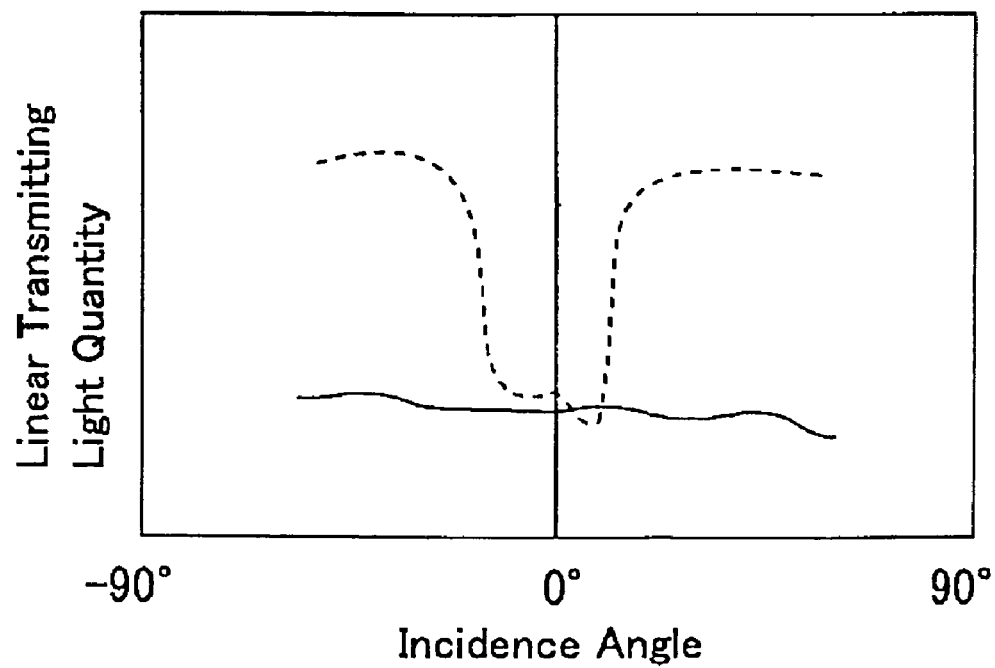
FIG. 31 is a perspective schematic diagram showing a scattering property of the previous anisotropic scattering film.

(Preparation of Fourth Anisotropic Scattering Film)
Ultraviolet light was irradiated to a photopolymerizable composition, sandwiched between the same PET films as in the first anisotropic scattering film, at the same irradiation intensity as in the first anisotropic scattering film vertically from a linear UV light source with a luminescent length of 125 mm (Product name: Handy UV unit HUV-1000, manufacture by Japan UV Machine, Inc.) located in the direction orthogonal to the long side of the PET film to obtain a four than isotropic scattering film having plate-like regions 40 having the refractive index different from those of surrounding regions as shown in FIG. 30.

Figure 16:
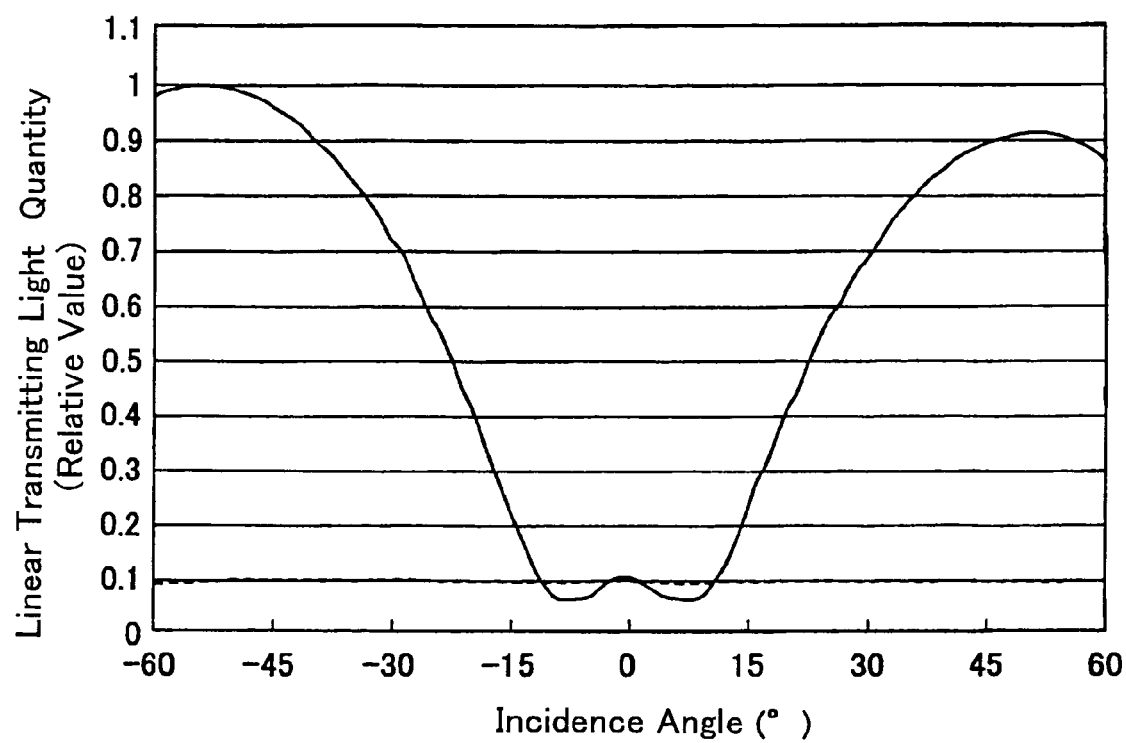
FIG. 16 is a view showing a relationship between the incidence angle and the linear transmitting light quantity when a fourth anisotropic scattering film is rotated about two mutually perpendicular rotation axes respectively.
Figure 17A:
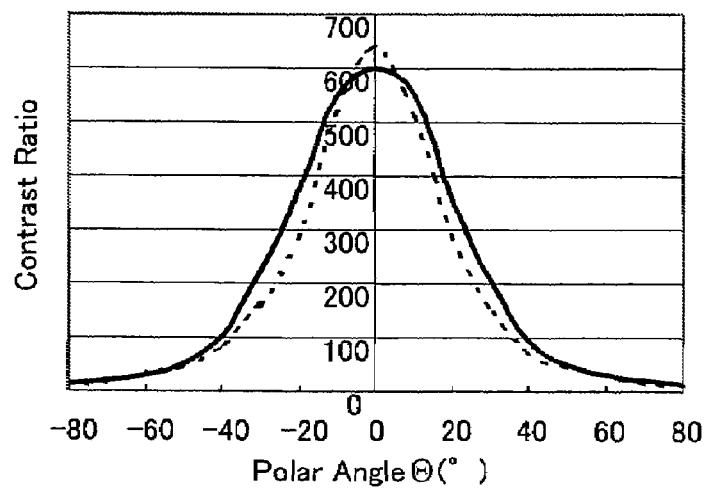
FIG. 17A is a view showing polar angle dependency of contrast ratio at azimuth angles Φ of 45 and 225° of a VA mode liquid crystal display element (dotted line) and a VA mode liquid crystal display (solid line) concerning Embodiment 1 of the present invention.
Figure 17B:
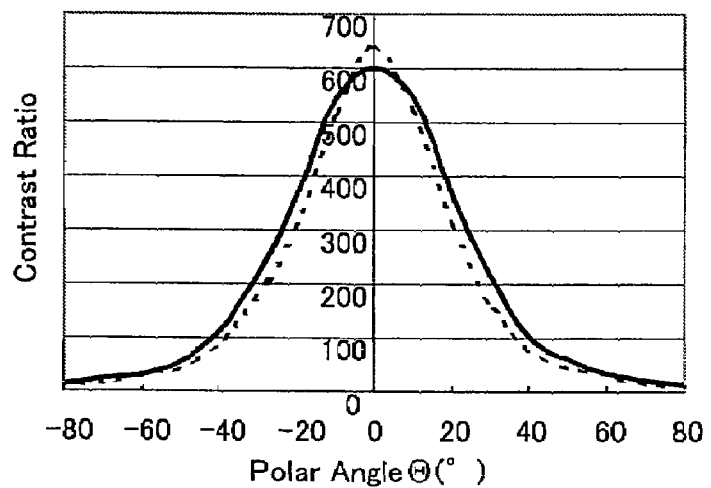
FIG. 17B is a view showing polar angle dependency of contrast ratio at azimuth angles Φ of 135 and 315° of the VA mode liquid crystal display element (dotted line) and the VA mode liquid crystal display (solid line) concerning Embodiment 1 of the present invention.
Figure 17C:
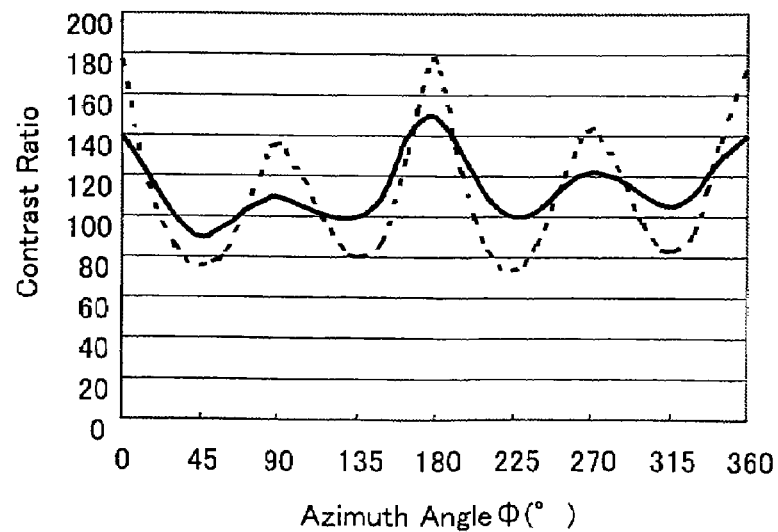
FIG. 17C is a view showing azimuth angle dependency of contrast ratio at a polar angle Θ of 40° of the VA mode liquid crystal display element (dotted line) and the VA mode liquid crystal display (solid line) concerning Embodiment 1 of the present invention.
Figure 18A:
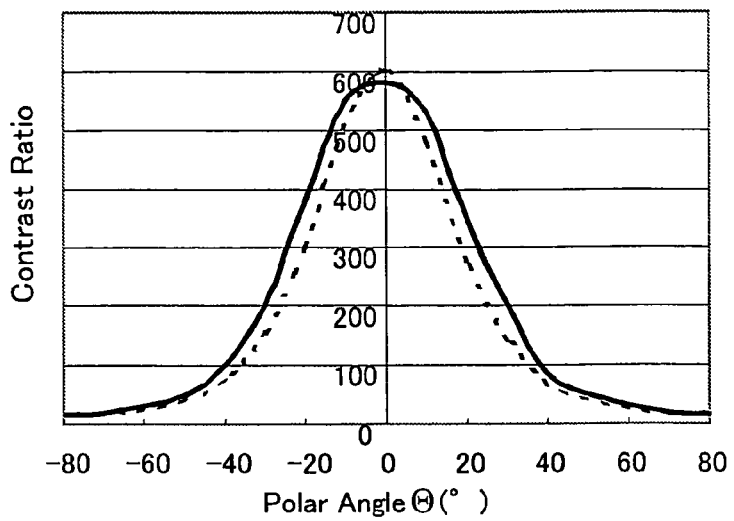
FIG. 18A is a view showing polar angle dependency of contrast ratio at azimuth angles Φ of 45 and 225° of a VA mode liquid crystal display element (dotted line) and a VA mode liquid crystal display (solid line) concerning Embodiment 2 of the present invention.
Figure 18B:
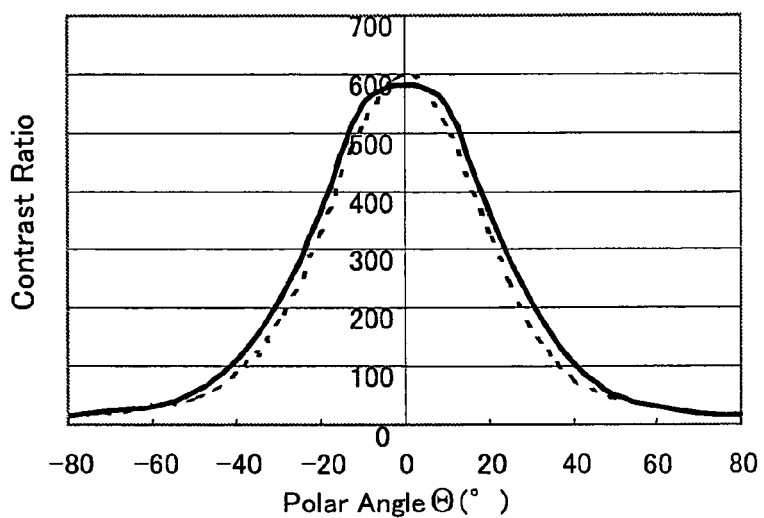
FIG. 18B is a view showing polar angle dependency of contrast ratio at azimuth angles Φ of 135 and 315° of the VA mode liquid crystal display element (dotted line) and the VA mode liquid crystal display (solid line) concerning Embodiment 2 of the present invention.
Figure 18C:
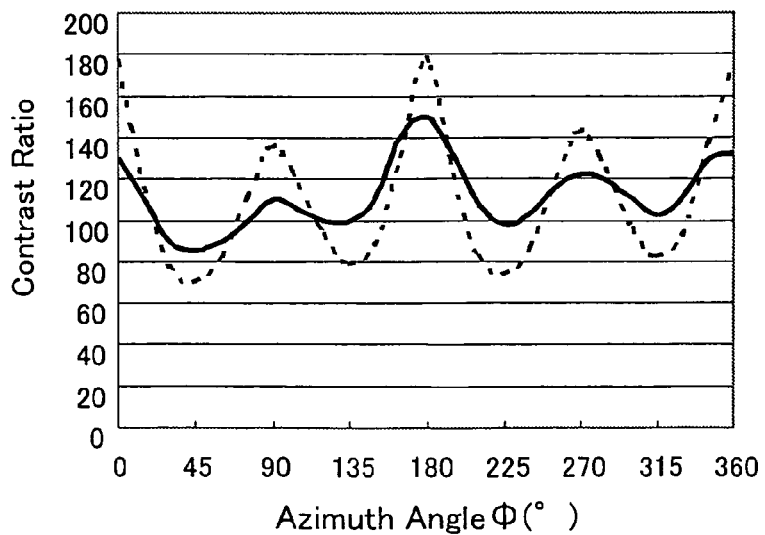
FIG. 18C is a view showing azimuth angle dependency of contrast ratio at a polar angle Θ of 40° of the VA mode liquid crystal display element (dotted line) and the VA mode liquid crystal display (solid line) concerning Embodiment 2 of the present invention.
Figure 19A:
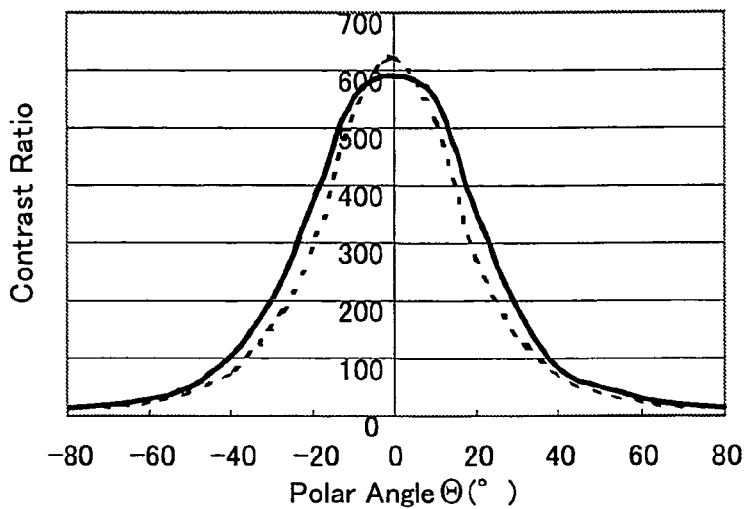
FIG. 19A is a view showing polar angle dependency of contrast ratio at azimuth angles Φ of 45 and 225° of a VA mode liquid crystal display element (dotted line) and a VA mode liquid crystal display (solid line) concerning Embodiment 3 of the present invention.
Figure 19B:
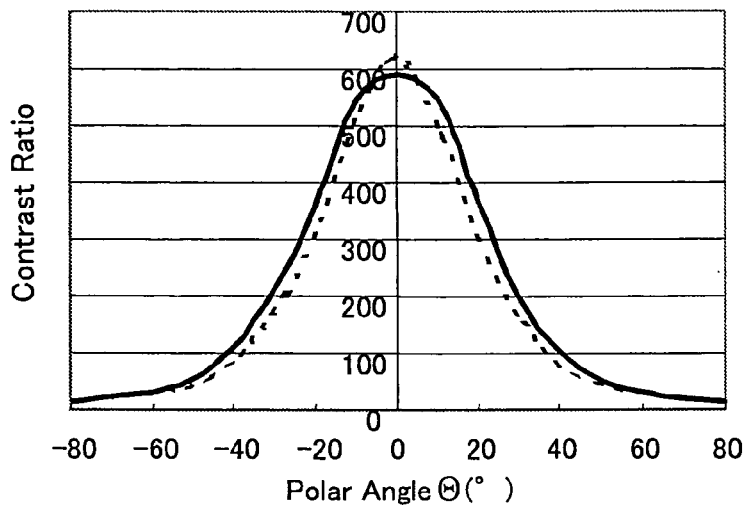
FIG. 19B is a view showing polar angle dependency of contrast ratio at azimuth angles Φ of 135 and 315° of the VA mode liquid crystal display element (dotted line) and the VA mode liquid crystal display (solid line) concerning Embodiment 3 of the present invention.
Figure 19C:
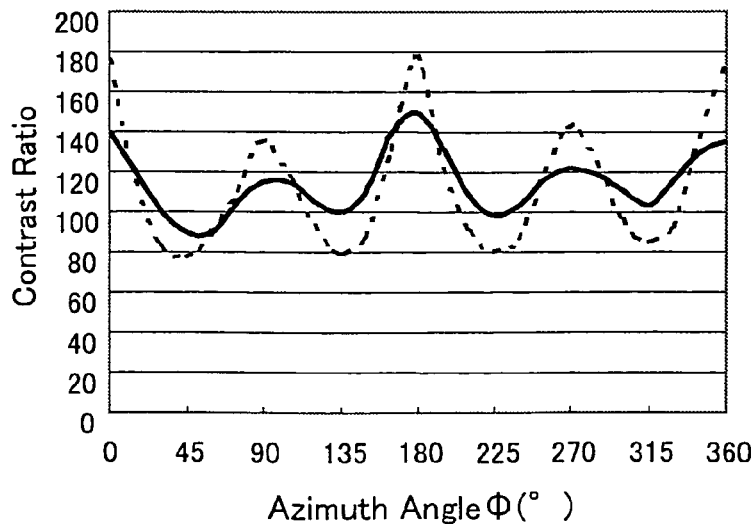
FIG. 19C is a view showing azimuth angle dependency of contrast ratio at a polar angle Θ of 40° of the VA mode liquid crystal display element (dotted line) and the VA mode liquid crystal display (solid line) concerning Embodiment 3 of the present invention.
Figure 20A:
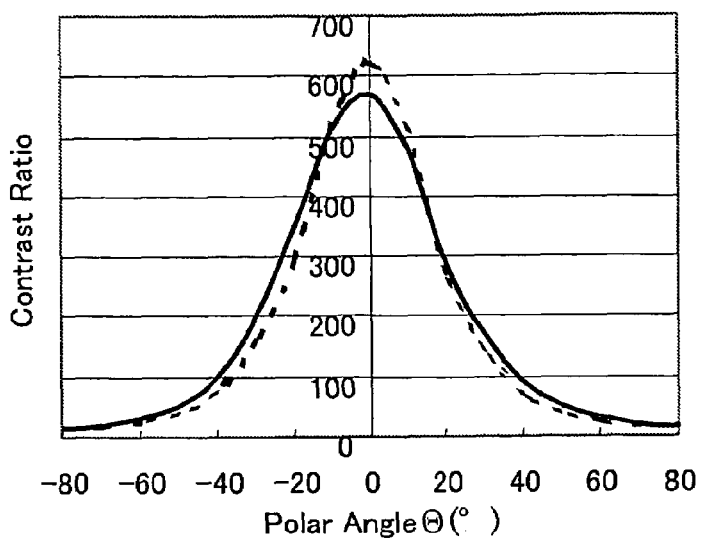
FIG. 20A is a view showing polar angle dependency of contrast ratio at azimuth angles Φ of 45 and 225° of a VA mode liquid crystal display element (dotted line) and a VA mode liquid crystal display (solid line) concerning Embodiment 4 of the present invention.
Figure 20B:
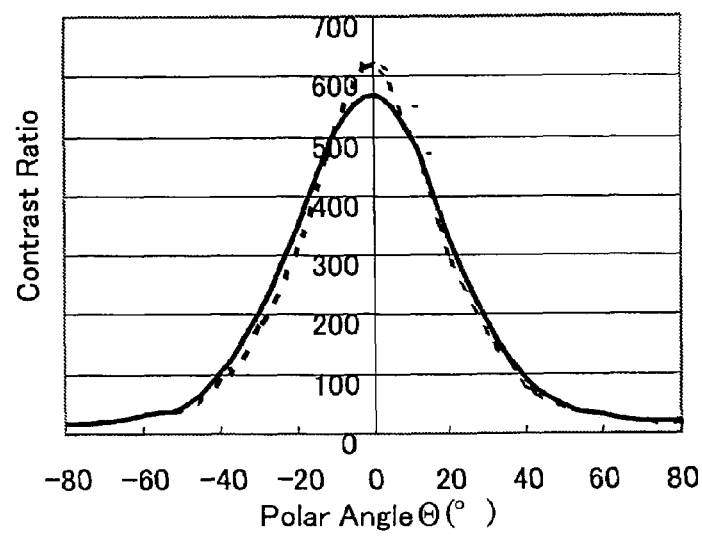
FIG. 20B is a view showing polar angle dependency of contrast ratio at azimuth angles Φ of 135 and 315° of the VA mode liquid crystal display element (dotted line) and the VA mode liquid crystal display (solid line) concerning Embodiment 4 of the present invention.
Figure 20C:
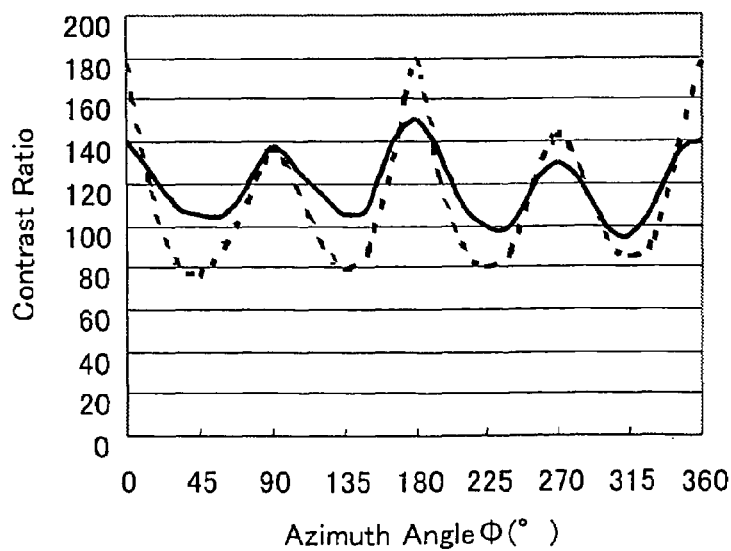
FIG. 20C is a view showing azimuth angle dependency of contrast ratio at a polar angle Θ of 40° of the VA mode liquid crystal display element (dotted line) and the VA mode liquid crystal display (solid line) concerning Embodiment 4 of the present invention.

(Measurement of Scattering Property of Fourth Anisotropic Scattering Film)
The fourth anisotropic scattering film was measured in the same manner as in the first anisotropic scattering film using a goniophotometer (Product name: GoniophotoMeter GP-5, manufactured by Murakami Color Research Laboratory Co., Ltd.). The scattering property of the fourth anisotropic scattering film is shown in FIG. 16. In addition, a solid line in the drawing represents the case of performing a rotation about the short side axis and a broken line represents the case of performing a rotation about the long side axis. In addition, the plus and minus signs of the incidence angle represent the directions of rotation.

As shown in FIG. 16, the scattering property of the fourth anisotropic scattering film has the form of a deep valley including a small peak at the incidence angle of 0° and is approximately symmetric, similar to the first anisotropic scattering film in the case of performing a rotation about the short side axis and it exhibited an isotropic scattering property that the linear transmitting light quantity changes little with changes in the incidence angle in the case of performing a rotation about the long side axis. Further, a rate of change in the linear transmitting light quantity was 0.90 in the case of performing a rotation about the short side axis and it was 0 in the case of performing a rotation about the long side axis.

(Preparation of Liquid Crystal Display)

The fourth anisotropic scattering film was bonded to a viewing screen side of the VA mode liquid crystal display element 15a prototyped in Embodiment 4 to prepare a VA mode liquid crystal display. In addition, the constitution of the liquid crystal display is the same as that of Embodiment 6 except for using the fourth anisotropic scattering film instead of the first anisotropic scattering film.

2. Measurement of Optical Properties of Liquid Crystal Display

On the liquid crystal displays of Embodiments 1 to 10 and Comparative Examples 1 to 3, viewing angle dependency of the luminance and the chromaticity at the time of displaying black (grading value: 0), displaying intermediate scale (grading value: 128) and displaying white (grading value: 255) in displaying 256 gray scales using a viewing angle measuring apparatus (Product name: EZContrast 160R, manufactured by ELDIM company) were measured. The viewing angle is represented by a polar angle Θ and an azimuth angle Φ.

<Evaluation of Improvement in Viewing Angle Dependency of Contrast Ratio>

The polar angle dependency of contrast ratio (CR) was evaluated at azimuth angles Φ of 45, 135, 225 and 315° in VA mode and IPS mode liquid crystal display elements and liquid crystal displays, and at azimuth angles Φ of 0, 90, 180 and 270° in TN mode and OCB mode liquid crystal display elements and liquid crystal displays. Further, all of these azimuth angles Φ are the azimuth angles having a narrow viewing angle in the respective display mode. In addition, the azimuth angle dependency of contrast ratio at a polar angle Θ of 40° was evaluated. In addition, the contrast ratio was determined from the following equation (3) based on the measured luminance at the time of displaying black (grading value: 0) and at the time of displaying white (grading value: 255).

(contrast ratio)=(luminance at displaying white)/(luminance at displaying black)   (3)

The viewing angle dependency of contrast ratios of VA mode liquid crystal display element and VA mode liquid crystal display of Embodiments 1 to 10 and Comparative Examples 1 to 3 are shown in FIGS. 17A-17C to 29A-29C. In drawings, solid lines represent a contrast ratio of the liquid crystal display and broke lines represent a contrast ratio of the liquid crystal display element.

Figure 27A:
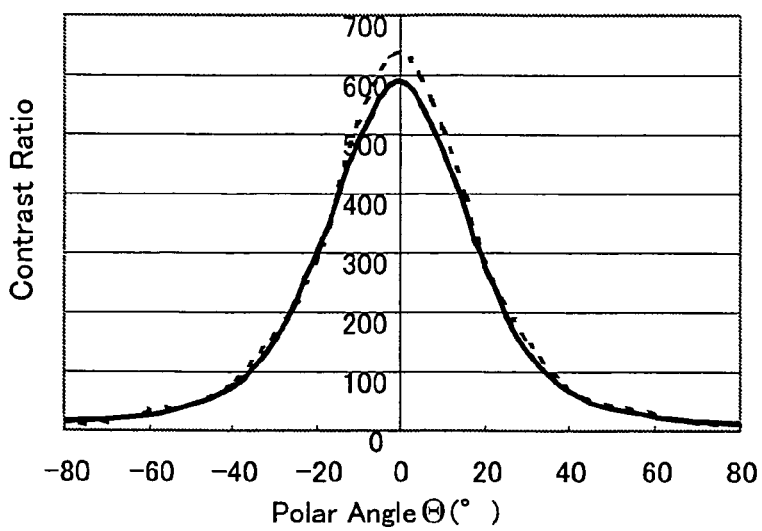
FIG. 27A is a view showing polar angle dependency of contrast ratio at azimuth angles Φ of 45 and 225° of a VA mode liquid crystal display element (dotted line) and a VA mode liquid crystal display (solid line) concerning Comparative Example 1.
Figure 27B:
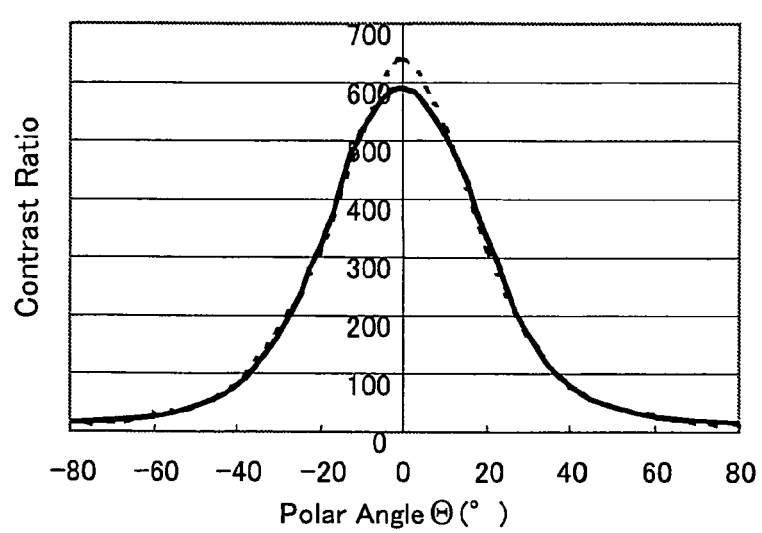
FIG. 27B is a view showing polar angle dependency of contrast ratio at azimuth angles Φ of 135 and 315° of the VA mode liquid crystal display element (dotted line) and the VA mode liquid crystal display (solid line) concerning Comparative Example 1.
Figure 27C:
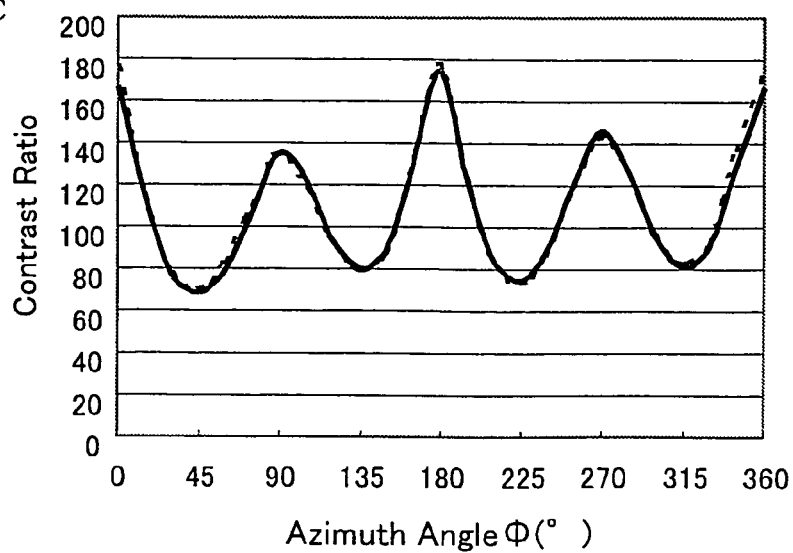
FIG. 27C is a view showing azimuth angle dependency of contrast ratio at a polar angle Θ of 40° of the VA mode liquid crystal display element (dotted line) and the VA mode liquid crystal display (solid line) concerning Comparative Example 1.
Figure 28A:
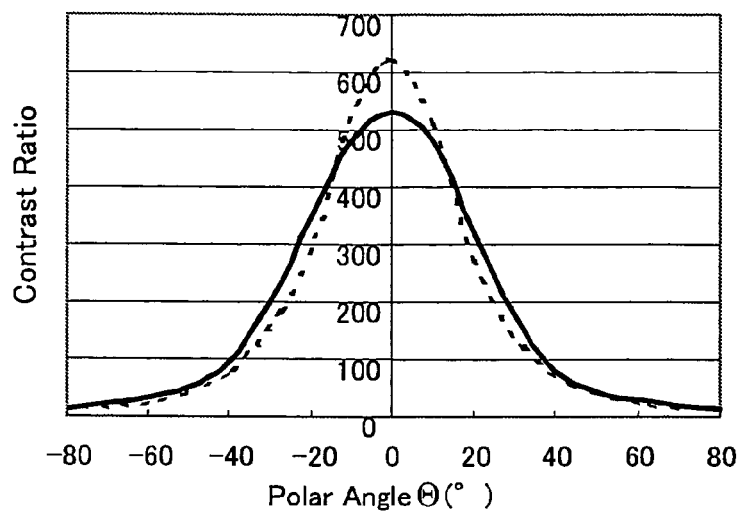
FIG. 28A is a view showing polar angle dependency of contrast ratio at azimuth angles Φ of 45 and 225° of a VA mode liquid crystal display element (dotted line) and a VA mode liquid crystal display (solid line) concerning Comparative Example 2.
Figure 28B:
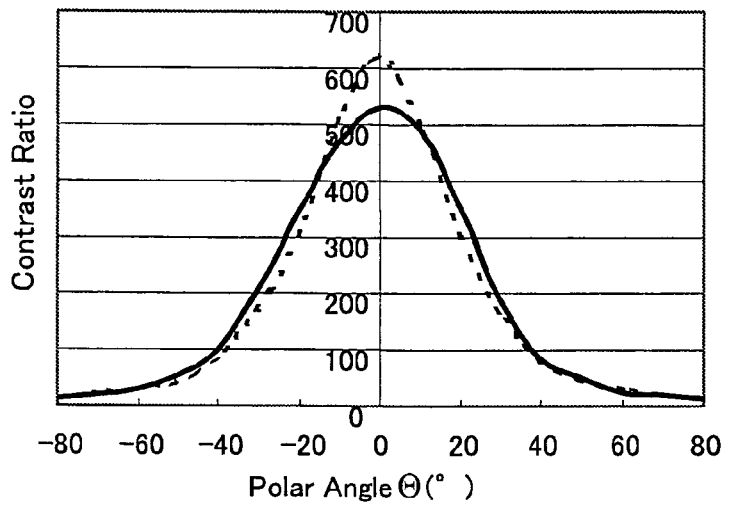
FIG. 28B is a view showing polar angle dependency of contrast ratio at azimuth angles Φ of 135 and 315° of the VA mode liquid crystal display element (dotted line) and the VA mode liquid crystal display (solid line) concerning Comparative Example 2.
Figure 28C:
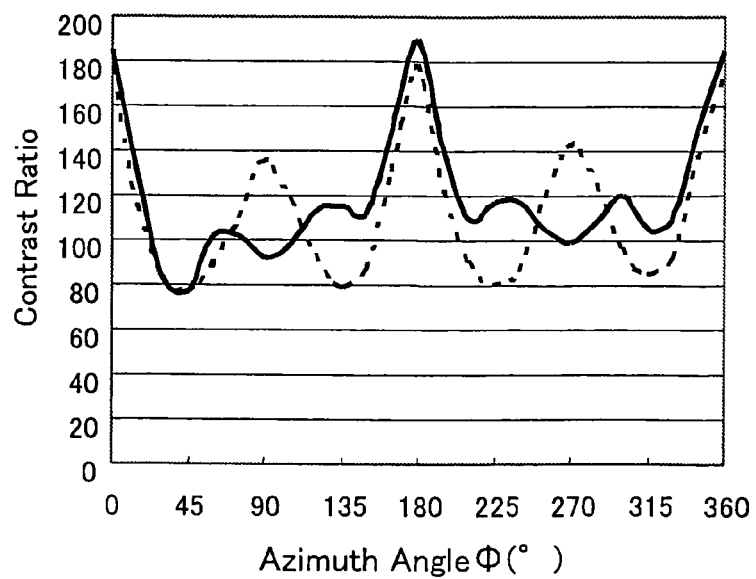
FIG. 28C is a view showing azimuth angle dependency of contrast ratio at a polar angle Θ of 40° of the VA mode liquid crystal display element (dotted line) and the VA mode liquid crystal display (solid line) concerning Comparative Example 2.
Figure 29A:
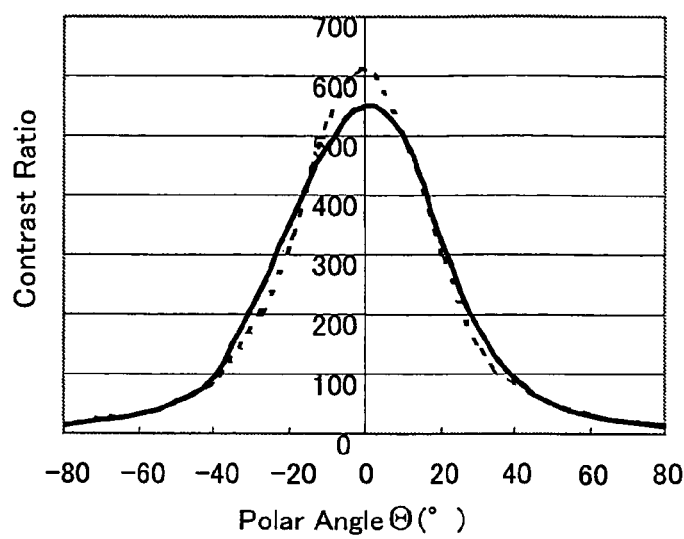
FIG. 29A is a view showing polar angle dependency of contrast ratio at azimuth angles Φ of 45 and 225° of a VA mode liquid crystal display element (dotted line) and a VA mode liquid crystal display (solid line) concerning Comparative Example 3.
Figure 29B:
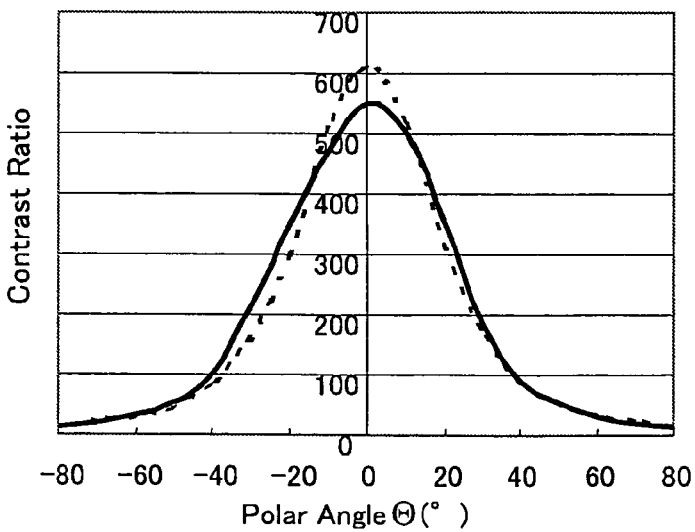
FIG. 29B is a view showing polar angle dependency of contrast ratio at azimuth angles Φ of 135 and 315° of the VA mode liquid crystal display element (dotted line) and the VA mode liquid crystal display (solid line) concerning Comparative Example 3.
Figure 29C:
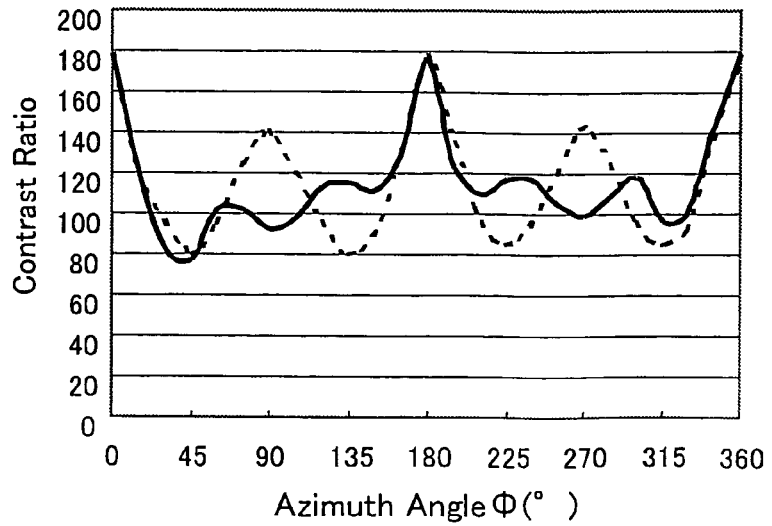
FIG. 29C is a view showing azimuth angle dependency of contrast ratio at a polar angle Θ of 40° of the VA mode liquid crystal display element (dotted line) and the VA mode liquid crystal display (solid line) concerning Comparative Example 3.

As is evident from FIGS. 17A-17C to 29A-29C, contrast ratios of the VA mode liquid crystal display element of each Embodiment and Comparative Example had the viewing angle dependency. On the other hand, in the VA mode liquid crystal display of Embodiments 1 to 7 of the present invention, as shown in FIGS. 17A-17C to 23A-23C, contrast ratios in the front direction (polar angle Θ=0°) did not decrease by a large amount and viewing angle dependency of contrast ratios at azimuth angles Φ, having a narrow viewing angle, of 45, 135, 225 and 315° were improved. However, in the VA mode liquid crystal display of Comparative Example 1, as shown in FIGS. 27A-27C, a CR in the front direction did not decrease by a large amount and an effect of improving viewing angle dependency of contrast ratios at azimuth angles Φ, having a narrow viewing angle, of 45, 135, 225 and 315° was little attained. In addition, in the VA mode liquid crystal display of Comparative Examples 2 and 3, as shown in FIGS. 28A-28C and 29A-29C, an effect of improving viewing angle dependency of contrast ratio was attained only in a specific direction and contrast ratio s in the front direction were reduced.

In addition, the VA mode liquid crystal displays concerning Embodiments 3 to 5 have the same constitution except that an angle formed by the axial direction of the anisotropic scattering film and the direction showing the largest contrast ratio of the VA mode liquid crystal display element is 0° in Embodiment 3, 15° in Embodiment 4 and 30° in Embodiment 5.

Figure 21A:
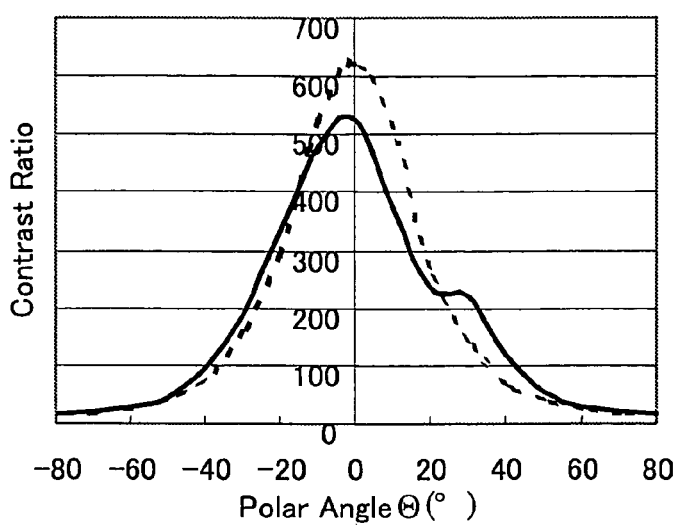
FIG. 21A is a view showing polar angle dependency of contrast ratio at azimuth angles Φ of 45 and 225° of a VA mode liquid crystal display element (dotted line) and a VA mode liquid crystal display (solid line) concerning Embodiment 5 of the present invention.
Figure 21B:
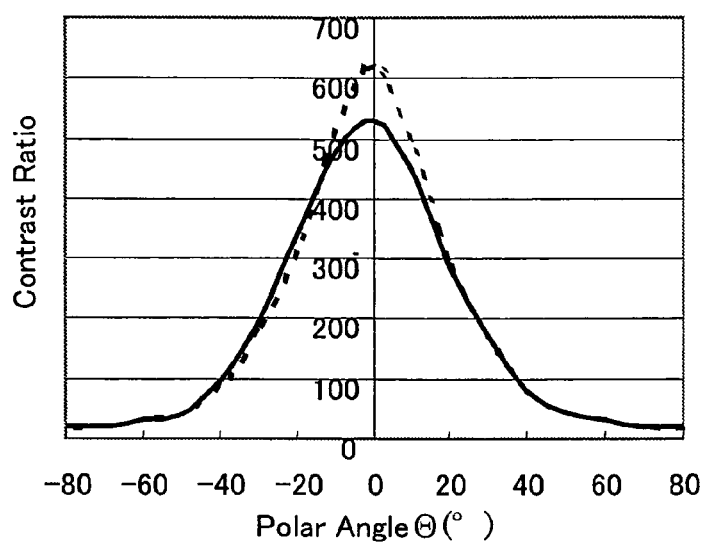
FIG. 21B is a view showing polar angle dependency of contrast ratio at azimuth angles Φ of 135 and 315° of the VA mode liquid crystal display element (dotted line) and the VA mode liquid crystal display (solid line) concerning Embodiment 5 of the present invention.
Figure 21C:
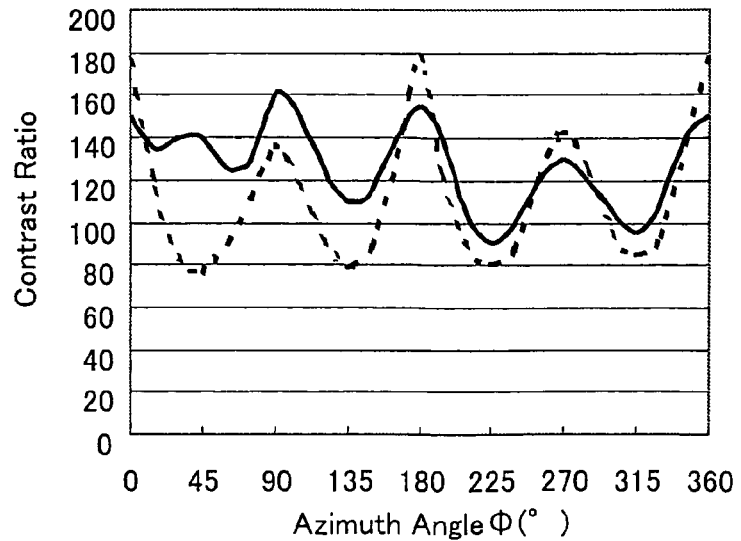
FIG. 21C is a view showing azimuth angle dependency of contrast ratio at a polar angle Θ of 40° of the VA mode liquid crystal display element (dotted line) and the VA mode liquid crystal display (solid line) concerning Embodiment 5 of the present invention.
Figure 22A:
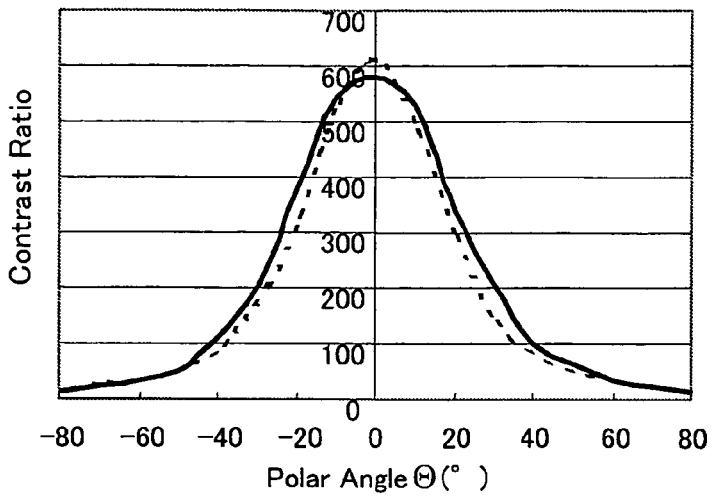
FIG. 22A is a view showing polar angle dependency of contrast ratio at azimuth angles Φ of 45 and 225° of a VA mode liquid crystal display element (dotted line) and a VA mode liquid crystal display (solid line) concerning Embodiment 6 of the present invention.
Figure 22B:
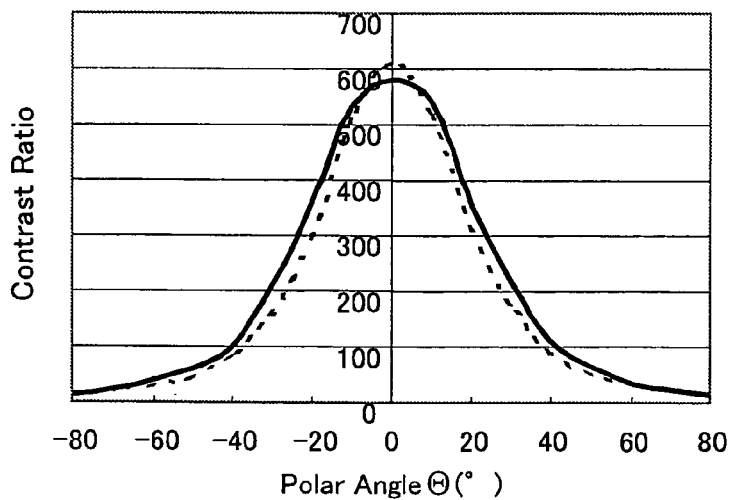
FIG. 22B is a view showing polar angle dependency of contrast ratio at azimuth angles Φ of 135 and 315° of the VA mode liquid crystal display element (dotted line) and the VA mode liquid crystal display (solid line) concerning Embodiment 6 of the present invention.
Figure 22C:
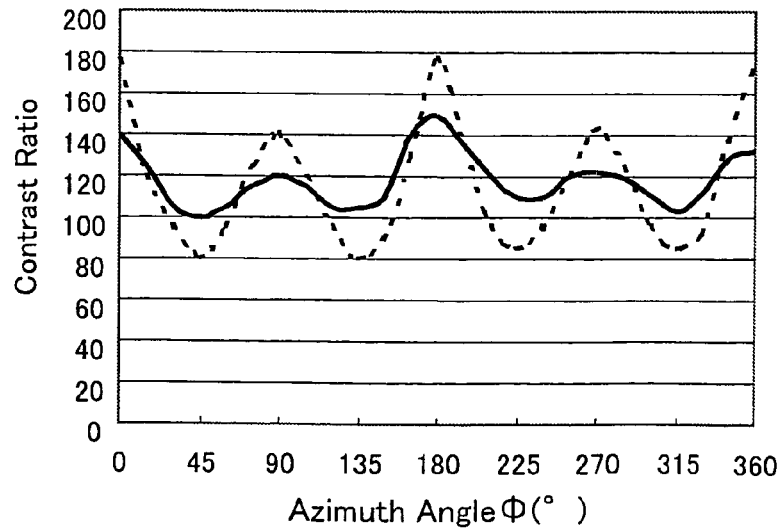
FIG. 22C is a view showing azimuth angle dependency of contrast ratio at a polar angle Θ of 40° of the VA mode liquid crystal display element (dotted line) and the VA mode liquid crystal display (solid line) concerning Embodiment 6 of the present invention.
Figure 23A:
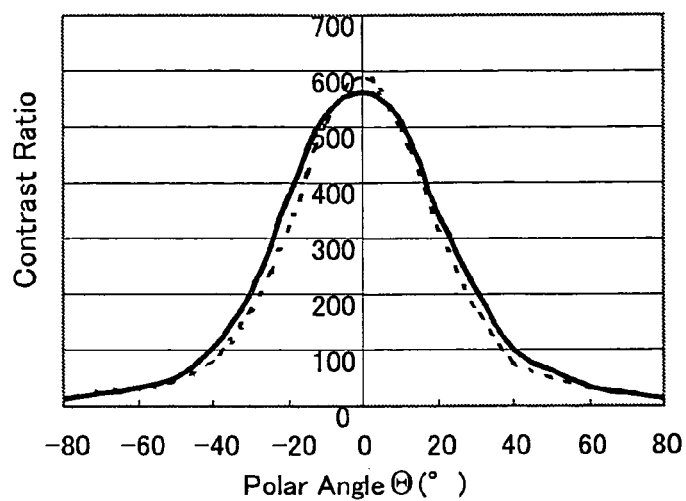
FIG. 23A is a view showing polar angle dependency of contrast ratio at azimuth angles Φ of 45 and 225° of a VA mode liquid crystal display element (dotted line) and a VA mode liquid crystal display (solid line) concerning Embodiment 7 of the present invention.
Figure 23B:
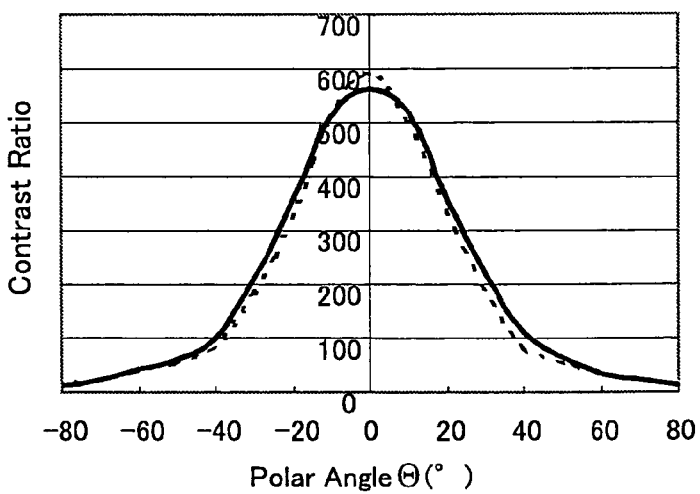
FIG. 23B is a view showing polar angle dependency of contrast ratio at azimuth angles Φ of 135 and 315° of the VA mode liquid crystal display element (dotted line) and the VA mode liquid crystal display (solid line) concerning Embodiment 7 of the present invention.
Figure 23C:
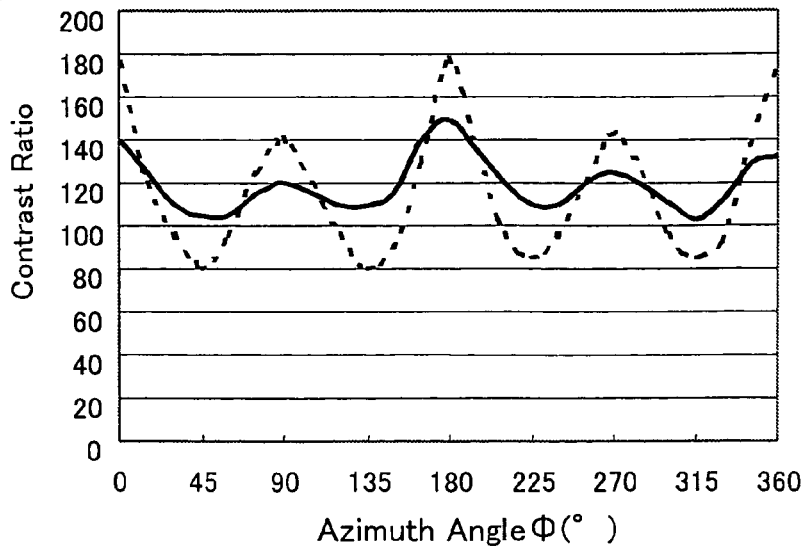
FIG. 23C is a view showing azimuth angle dependency of contrast ratio at a polar angle Θ of 40° of the VA mode liquid crystal display element (dotted line) and the VA mode liquid crystal display (solid line) concerning Embodiment 7 of the present invention.

In the VA mode liquid crystal display concerning Embodiment 5 in which the above-mentioned formed angle is 30°, as shown in FIGS. 21A-21C, viewing angle dependency of contrast ratio was improved at azimuth angle of 45° which is parallel to the axial azimuth of the scattering central axis of the third anisotropic scattering film and one of the azimuths having a narrow viewing angle, of 45, 135, 225 and 315°, but was not improved at azimuth angle of 135, 225 and 315°.

On the other hand, in the VA mode liquid crystal displays concerning Embodiment 3 and 4 in which the above-mentioned formed angle is 15° or less, as shown in FIGS. 19A-19C and 20A-20C, viewing angle dependency of contrast ratio was improved at all azimuth angles having narrow viewing angles, of 45, 135, 225 and 315°. Specifically, in the VA mode liquid crystal display concerning Embodiment 3 in which the above-mentioned formed angle is 0°, the largest contrast ratio little deteriorated and viewing angle dependency of contrast ratio was improved equally at all azimuth angles having narrow viewing angles of 45, 135, 225 and 315°. Therefore, it was found that an angle formed by the axial direction of the scattering central axis and the direction showing the largest contrast ratio of the liquid crystal display element is preferably 15° or less and more preferably smaller.

Further, in the TN mode liquid crystal display of Embodiment 8 of the present invention, contrast ratios at azimuth angles Φ, having a narrow viewing angle, of 0, 90, 180 and 270° were improved without decreasing the largest contrast ratio at an inclination of 100 from the direction of the normal to the viewing screen to azimuth angle Φ of 180° with respect to the TN mode liquid crystal display element.

Figure 24A:
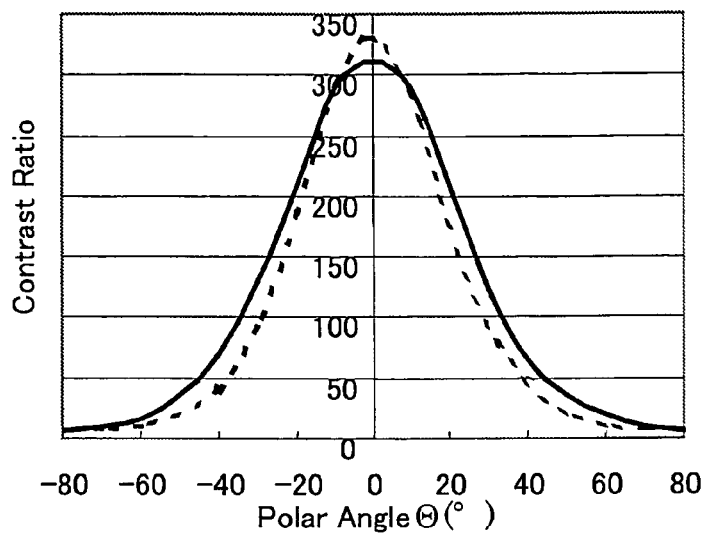
FIG. 24A is a view showing polar angle dependency of contrast ratio at azimuth angles Φ of 0 and 180° of a TN mode liquid crystal display element (dotted line) and a TN mode liquid crystal display (solid line) concerning Embodiment 8 of the present invention.
Figure 24B:
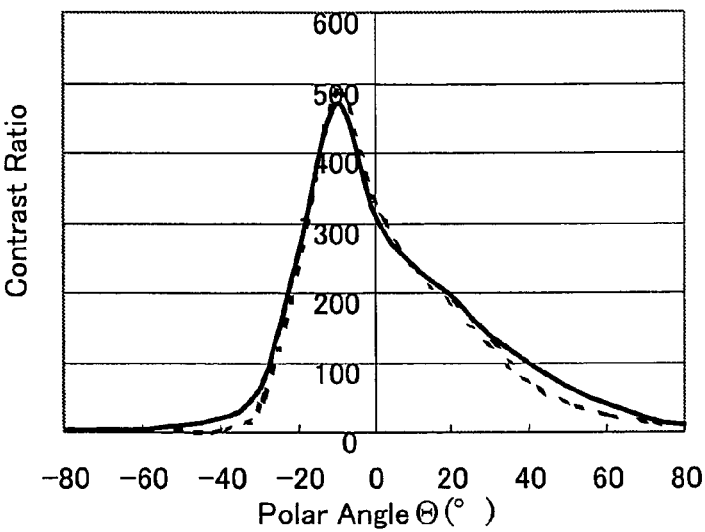
FIG. 24B is a view showing polar angle dependency of contrast ratio at azimuth angles Φ of 90 and 270° of the TN mode liquid crystal display element (dotted line) and the TN mode liquid crystal display (solid line) concerning Embodiment 8 of the present invention.
Figure 24C:
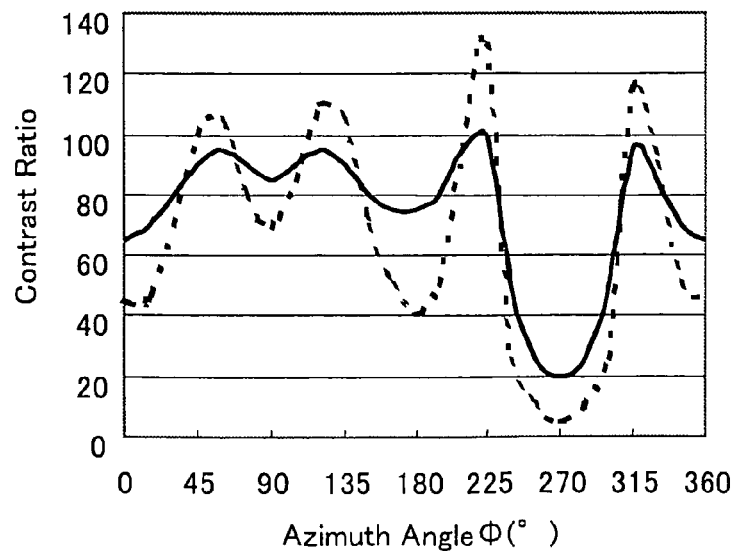
FIG. 24C is a view showing azimuth angle dependency of contrast ratio at a polar angle Θ of 40° of the TN mode liquid crystal display element (dotted line) and the TN mode liquid crystal display (solid line) concerning Embodiment 8 of the present invention.
Figure 25A:
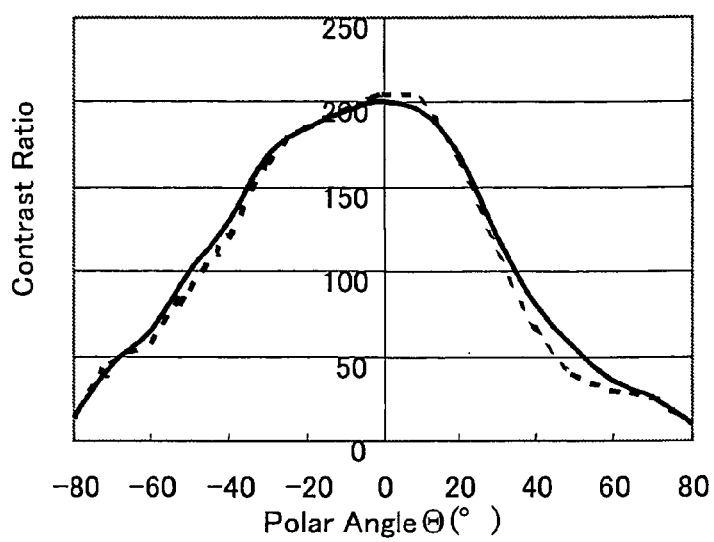
FIG. 25A is a view showing polar angle dependency of contrast ratio at azimuth angles Φ of 45 and 225° of an IPS mode liquid crystal display element (dotted line) and an IPS mode liquid crystal display (solid line) concerning Embodiment 9 of the present invention.
Figure 25B:
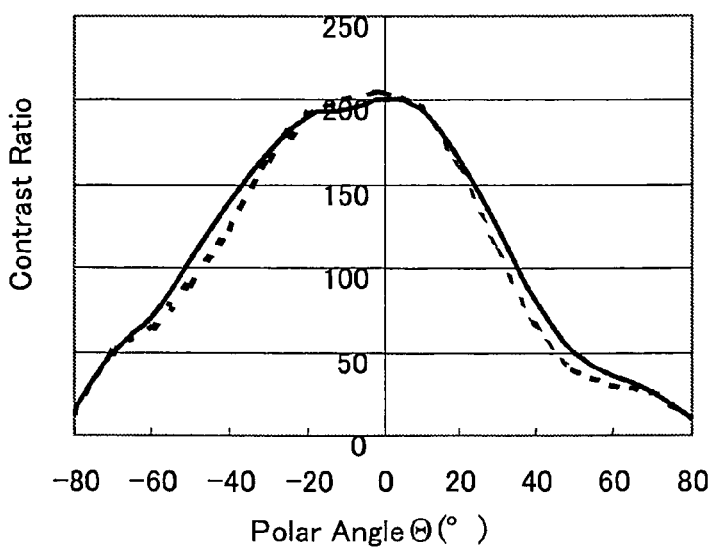
FIG. 25B is a view showing polar angle dependency of contrast ratio at azimuth angles Φ of 135 and 315° of the IPS mode liquid crystal display element (dotted line) and the IPS mode liquid crystal display (solid line) concerning Embodiment 9 of the present invention.
Figure 25C:
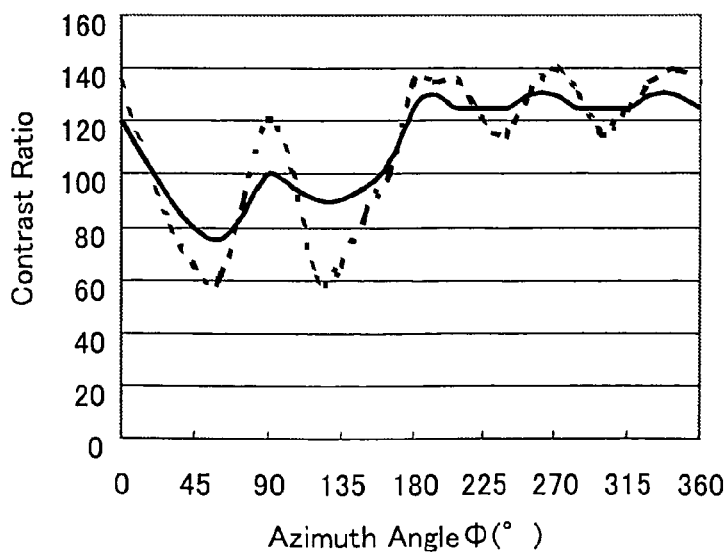
FIG. 25C is a view showing azimuth angle dependency of contrast ratio at a polar angle Θ of 40° of the IPS mode liquid crystal display element (dotted line) and the IPS mode liquid crystal display (solid line) concerning Embodiment 9 of the present invention.

Furthermore, in the IPS mode liquid crystal display of Embodiment 9 of the present invention, as shown in FIGS. 24A to 24C, contrast ratios at azimuth angles Φ, having a narrow viewing angle, of 45, 135, 225 and 315° were improved without decreasing a contrast ratio in the front direction (polar angle Θ=0°) by a large amount with respect to the IPS mode liquid crystal display element.

Figure 26A:
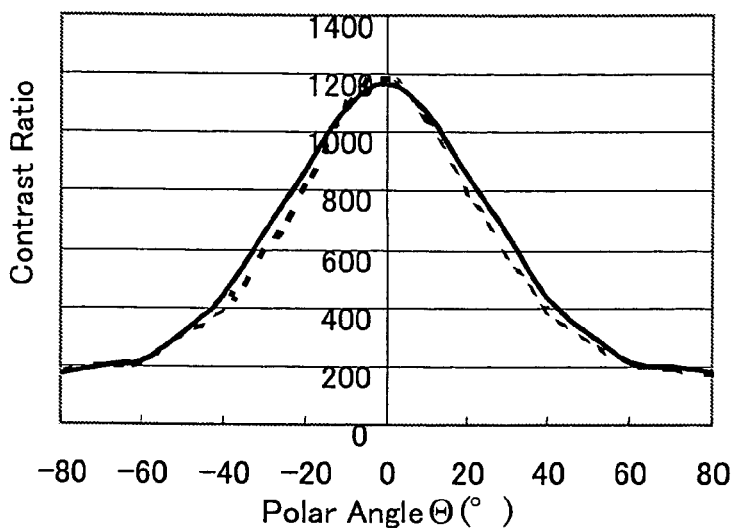
FIG. 26A is a view showing polar angle dependency of contrast ratio at azimuth angles Φ of 0 and 180° of an OCB mode liquid crystal display element (dotted line) and an OCB mode liquid crystal display (solid line) concerning Embodiment 10 of the present invention.
Figure 26B:
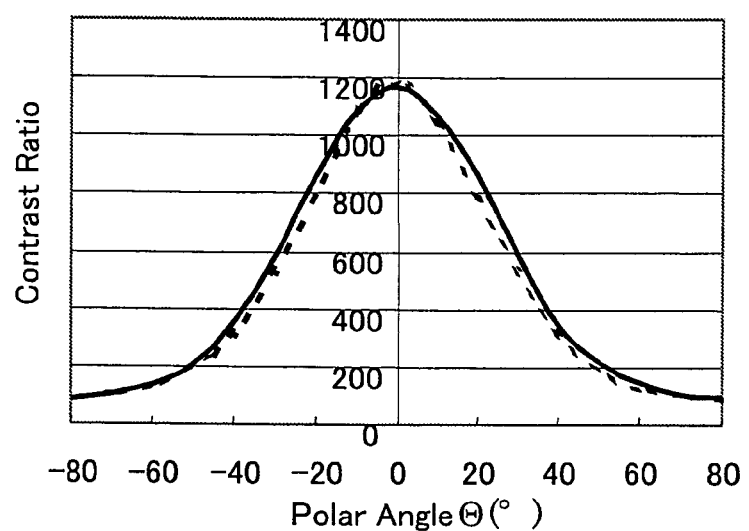
FIG. 26B is a view showing polar angle dependency of contrast ratio at azimuth angles Φ of 90 and 270° of the OCB mode liquid crystal display element (dotted line) and the OCB mode liquid crystal display (solid line) concerning Embodiment 10 of the present invention.
Figure 26C:
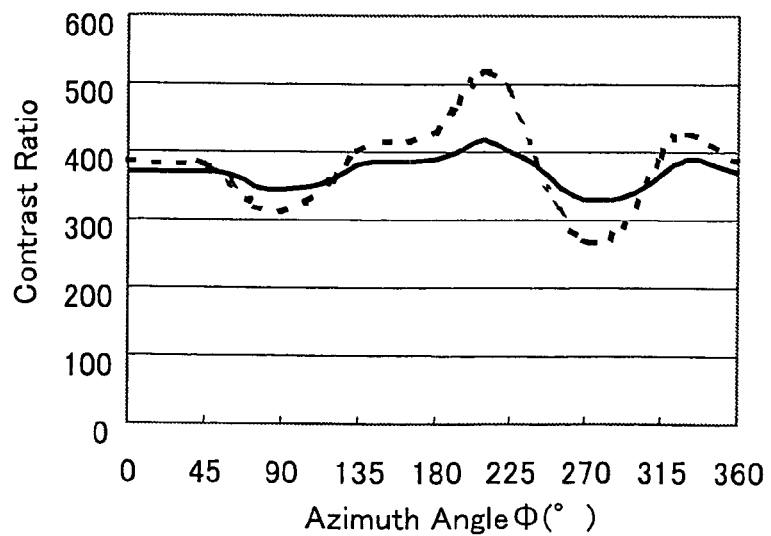
FIG. 26C is a view showing azimuth angle dependency of contrast ratio at a polar angle Θ of 40° of the OCB mode liquid crystal display element (dotted line) and the OCB mode liquid crystal display (solid line) concerning Embodiment 10 of the present invention.

In addition, in the OCB mode liquid crystal display of Embodiment 10 of the present invention, as shown in FIGS. 26A to 26C, contrast ratios at azimuth angles Φ, having a narrow viewing angle, of 0, 90, 180 and 270° were improved without decreasing a contrast ratio in the front direction (polar angle $\Theta=0°$) by a large amount, with respect to the OCB mode liquid crystal display element.

This is described as follow. As shown in FIGS. 17A-17C to 29A-29C, contrast ratios of the VA mode, IPS mode and OCB mode liquid crystal display elements are the largest in the direction of the normal to the viewing screen (the front direction). And, contrast ratio of the TN mode liquid crystal display element is the largest at the inclination of 10° from the direction of the normal to the viewing screen. In accordance with the liquid crystal displays concerning Embodiments 1 to 10, each of the first, second, and third anisotropic scattering films is bonded on the viewing screen side of the liquid crystal display element so that the axial direction of the scattering central axis of the each anisotropic scattering film can be parallel to the direction showing the largest contrast ratio of the liquid crystal display element, and therefore incident light in the direction showing the largest contrast ratio of the display element is scattered in all directions and leveled, and viewing angle dependency of the contrast ratio is improved at azimuths having a narrow viewing angle. And, each of the first, second, and third anisotropic scattering films exibits the anisotropic scattering property shown in FIGS. 5A to 5C, and incident light in the direction showing low contrast ratio of the display element is scattered weakly by the anisotropic scattering film, it is possible to inhibit the display quality in the direction showing the contrast ratio in the direction showing the largest contrast ratio from deteriorating due to the scattering of incident light in the direction showing low contrast ratio of the display element.

On the other hand, in accordance with the liquid crystal display concerning Comparative Example 1, the isotropic scattering film used instead of the first anisotropic scattering film cannot scatter incident light in the specific directions such as the direction showing the largest contrast ratio to all directions to level the light, and therefore viewing angle dependency of contrast ratio is not improved. And, in accordance with the liquid crystal display concerning Comparative Examples 2 and 3, both Lumisty (R) and the forth anisotropic scattering film exhibit the anisotropic scattering property only in the specific azimuth, and therefore effect of improving viewing angle dependency of contrast ratio is attained only in the specific azimuth showing anisotropic scattering property of these films. Further, Lumisty (R) and the forth anisotropic scattering film scatter incident light strongly in the direction showing low contrast ratio in the azimuth not showing anisotropic scattering property of these films, and therefore the largest contrast ratio in the front direction and like deteriorates due to the scattering of incident light in the direction showing low contrast ratio of the display element.

<Evaluation of Improvement in Deviation of Gamma Curve>

A gamma curve in the front direction (polar angle $\Theta=0°$) and a gamma curve in an oblique direction (polar angle $\Theta=40°$, azimuth angles $\Phi=0, 45, 90, 135, 180, 225, 270$ and $315°$) were determined and the luminance in displaying respective grey scales was normalized in such a way that the luminance at the time of displaying white become 1 and the difference (deviation quantity) between the normalized luminance in the front direction and the normalized luminance at respective azimuth angles $\Phi$ at the time of displaying intermediate scale (grading value: 128) was determined. Deviation quantity differentials between the liquid crystal display and the liquid crystal display element (deviation quantity of liquid crystal display element-deviation quantity of liquid crystal display) are shown in Table 1. Larger deviation quantity differentials show that an effect of improvement in the deviation of a gamma curve by a scattering film is larger.

TABLE 1

| | Polar Angle 40° Azimuth Angle | | | | | | | |
|---|---|---|---|---|---|---|---|---|
| | 0° | 45° | 90° | 135° | 180° | 225° | 270° | 315° |
| Embodiment 1 | 0.01 | 0.32 | 0.008 | 0.33 | 0.011 | 0.25 | 0.009 | 0.35 |
| Embodiment 2 | 0.08 | 0.35 | 0.05 | 0.38 | 0.03 | 0.3 | 0.06 | 0.36 |
| Embodiment 3 | 0.05 | 0.3 | 0.04 | 0.36 | 0.05 | 0.31 | 0.07 | 0.4 |
| Embodiment 4 | 0.07 | 0.38 | 0.06 | 0.35 | 0.04 | 0.29 | 0.06 | 0.36 |
| Embodiment 5 | 0.06 | 0.42 | 0.05 | 0.33 | 0.06 | 0.28 | 0.05 | 0.34 |
| Embodiment 6 | 0.1 | 0.36 | 0.03 | 0.42 | 0.03 | 0.35 | 0.04 | 0.41 |
| Embodiment 7 | 0.07 | 0.32 | 0.07 | 0.33 | 0.03 | 0.34 | 0.06 | 0.39 |
| Comparative Example 1 | 0.03 | 0.05 | 0.04 | 0.1 | 0.04 | 0.06 | 0.07 | 0.04 |
| Comparative Example 2 | 0.03 | 0.42 | 0.09 | 0.4 | 0.05 | 0.39 | 0.05 | 0.43 |
| Comparative Example 3 | 0.04 | 0.35 | 0.07 | 0.33 | 0.06 | 0.36 | 0.06 | 0.38 |

As is evident from Table 1, in the liquid crystal display concerning each Embodiment of the present invention, the effect of improving the deviation of a gamma curve in respective azimyths was attained. However, in the liquid crystal display concerning Comparative Example 1, the effect of improving the deviation was small particularly at azimuth angles $\Phi$ of 45, 135, 225 and 315°. In addition, in the liquid crystal display concerning Comparative Examples 2 and 3, the effect of improving the deviation was attained, but the contrast ratios in the front direction decreased by large amounts from the results of evaluations of improvement in the viewing angle dependency of a contrast ratio.

This is described as follow. A gamma curve of the VA mode liquid crystal display element is optimally designed in the direction showing the largest contrast ratio of the display element. In accordance with each liquid crystal display concerning Embodiments of the present invention, Comparative Examples 2 and 3, since the first anisotropic scattering film, Lumisty (R), and the forth anisotropic scattering film exhibits the anisotropic scattering property in at least one azimuth as shown in FIGS. 5, 16 and so on, viewing angle dependency of a gamma curve can be improved at azimuths having a narrow viewing angle by orienting the azimuth showing anisotropic scattering property of each film to the azimuth having a narrow viewing angle of the VA mode liquid crystal display element on bonding each film to the viewing screen side of the VA mode liquid crystal display element. In addition, in accordance with the liquid crystal display concerning each Embodiment of the present invention, since the first anisotropic scattering film exhibits the anisotropic scattering property in all azimuths, such an effect can be attained easily. On the other hand, in accordance with the liquid crystal display concerning Comparative Example 1, since the isotropic scattering film used instead of the first anisotropic scattering film does not exhibits the anisotropic scattering property, the film cannot scatter the incident light in the specific direction to all directions and the level the light, abd therefore viewing angle of a gamma curve cannnot be improved.

In addition, in the present description, "X (value) or more" and "X or less" include value X. That is, "X (value) or more" means "not less than X".

What is claimed is:

1. A display comprising:
a display element having viewing angle dependency of contrast ratio; and an anisotropic scattering film having an anisotropic scattering layer,
wherein the anisotropic scattering film has a scattering central axis approximately parallel to a direction showing the maximum contrast ratio of the display element and is located on a viewing screen side of the display element,
wherein a direction showing the maximum linear transmitting light quantity of the anisotropic scattering film is not perpendicular to the film surface of the anisotropic scattering film.

2. The display according to claim 1,
wherein the anisotropic scattering layer is formed by curing a composition containing a photo-curable compound.

3. The display according to claim 1,
wherein an angle formed by an axial direction of the scattering central axis and the direction showing the maximum contrast ratio of the display element is 15° or less.

4. The display according to claim 1,
wherein an angle formed by an axial direction of the scattering central axis and the direction showing the maximum contrast ratio of the display element is 10° or less.

5. The display according to claim 1,
wherein the anisotropic scattering layer has rod-shaped cured regions.

6. The display according to claim 1,
wherein the scattering central axis and the direction showing the maximum contrast ratio are not perpendicular to the film surface of the anisotropic scattering film.

7. A display comprising:
a display element having viewing angle dependency of contrast ratio; and
an anisotropic scattering film having an anisotropic scattering layer,
wherein the anisotropic scattering film has a scattering central axis approximately parallel to a direction showing the maximum contrast ratio of the display element and is located on a viewing screen side of the display element,
wherein the anisotropic scattering film has the scattering central axis in a direction forming a smaller angle with a direction showing the minimum linear transmitting light quantity of the anisotropic scattering film than an angle with a direction showing the maximum linear transmitting light quantity of the anisotropic scattering film.

8. The display according to claim 1,
wherein the display element is a liquid crystal display element.

9. The display according to claim 8,
wherein the liquid crystal display element has
a liquid crystal cell having a liquid crystal sandwiched between a pair of substrates and
a polarizing plate comprising a supporting film and a polarizing element.

10. The display according to claim 8,
wherein the liquid crystal display element has a display mode of a VA mode, a TN mode, an IPS mode or an OCB mode.

\* \* \* \* \*